United States Patent

Araki et al.

[11] Patent Number: 6,149,989
[45] Date of Patent: Nov. 21, 2000

[54] MAGNETIC RECORDING PARTICULATE MEDIUM

[75] Inventors: Hiroaki Araki; Tsuneo Yoshida; Toshichika Aoki; Masashi Aonuma; Kazuo Kato; Kazutoshi Katayama; Hiroshi Hashimoto, all of Kanagawa, Japan

[73] Assignee: Fuji Photo Film Co., Ltd., Kanagawa, Japan

[21] Appl. No.: 09/084,866

[22] Filed: May 28, 1998

[30] Foreign Application Priority Data

May 30, 1997 [JP] Japan ................................ 9-141872
Oct. 30, 1997 [JP] Japan ................................ 9-298611
Oct. 30, 1997 [JP] Japan ................................ 9-298612

[51] Int. Cl.$^7$ .................................................... G11B 5/66
[52] U.S. Cl. .................................. 427/694 BL; 427/128; 427/131; 428/423.1; 428/694 BA; 428/900
[58] Field of Search ........................... 427/128, 131; 428/900, 928, 694 BL, 694 BA, 423.1

[56] References Cited

U.S. PATENT DOCUMENTS

| | | |
|---|---|---|
| 4,670,337 | 6/1987 | Tokuoka et al. . |
| 5,508,117 | 4/1996 | Kawamata et al. . |
| 5,578,376 | 11/1996 | Hashimoto et al. . |
| 5,718,964 | 2/1998 | Naoe et al. . |
| 5,750,233 | 5/1998 | Ogawa et al. . |

FOREIGN PATENT DOCUMENTS

| | | |
|---|---|---|
| 0 592 922 A2 | 4/1994 | European Pat. Off. . |
| 0735524A2 | 3/1996 | European Pat. Off. . |
| 0 732 688 A2 | 9/1996 | European Pat. Off. . |
| 8306031 | 4/1995 | Japan . |
| 9-128739 | 5/1997 | Japan . |

OTHER PUBLICATIONS

Additional partial translation of JP 8–306031 (three pages) (no date avail.).
European Search Report (no date avail.).

*Primary Examiner*—Bernard Pianalto
*Attorney, Agent, or Firm*—Sughrue, Mion, Zinn, Macpeak & Seas, PLLC

[57] ABSTRACT

The present invention discloses a magnetic recording particulate medium having a magnetic layer on a nonmagnetic support, the magnetic layer containing a ferromagnetic metal powder and a binder and having a coercive force of 1,400 to 1,700 Oe, wherein the ferromagnetic metal powder is spindle-shaped particles consisting essentially of Fe and having a Co/Fe ratio of from 1 to 5 atomic %, an Al/Fe ratio of from 5 to 15 atomic %, an average major axis length of 0.1 to 0.2 μm and a specific surface area of 40 to 50 m$^2$/g, and the binder contains a polyurethane consisting essentially of a diol component comprising a polyether polyol and a polyester polyol and a polyisocyanate component. This magnetic recording particulate medium is characterized by minimal head wear, freedom from head clogging, and satisfactory electromagnetic characteristics.

20 Claims, 1 Drawing Sheet

MAGNETIC RECORDING PARTICULATE MEDIUM

FIELD OF THE INVENTION

The present invention relates to a magnetic recording particulate medium for broadcasting and use in a computer, i.e., applications requiring high reliability. More specifically, the invention relates to a magnetic recording particulate medium including a magnetic layer containing a predetermined ferromagnetic metal powder and a predetermined polyurethane.

RELATED ART

Magnetic recording particulate media are widely used as recordingtapes, videotapes, computer tapes, and disks. Magnetic recording particulate media have become high in density and short in recording wavelength year by year. Recording systems considered for them range from an analog system to a digital system.

In particular, magnetic recording particulate media comprising a ferromagnetic metal powder consisting essentially of iron coated on a plastic support together with a binder are currently the mainstream of media for broadcast videos and data recording because of their excellent cost performance. These magnetic recording particulate media for broadcast videos and data recording are required to have high electromagnetic characteristics. Since images and data that they handle become commercial products, they are also required to show running durability by which they can withstand severe use under various environmental conditions in comparison with general consumer uses.

In recent years, magnetic recording particulate media have been devised which have the coercive force (Hc) of a magnetic layer increased from a conventional value of about 1,500 Oe to close to 2,000 Oe, or which have a magnetic layer as an ultrathin layer $0.5\,\mu$ or less in thickness and have an intermediate layer consisting essentially of a nonmagnetic powder and a binder sandwiched between the magnetic layer and a support. Such magnetic recording particulate media achieve high density recording comparable to magnetic recording film media, in which a magnetic recording layer comprises a vacuum deposited cobalt alloy, while securing the excellent running durability of the particulate media.

However, the recording media having Hc of about 2,000 Oe or the recording media having a magnetic layer thickness of $0.5\,\mu$ or less require dedicated VTR's for their recording and replaying. That is, magnetic heads with a high recording capacity corresponding to high Hc are required. In case of a high Hc as well as a small magnetic layer thickness, the playback output of a high frequency component becomes large, while the output of a low frequency component becomes small. In a system originally intended for use with the medium having Hc of about 1,500 Oe, therefore, the error rate increases, or the output of a signal recorded on a linear track, such as an audio signal or a control signal, becomes small. Thus, such recording media are not suitable for practical use.

For these reasons, conventional magnetic recording particulate media with Hc of about 1,500 Oe are predominant even now in the market for magnetic recording particulate media for broadcast videos and data recording. With their widespread use on the market, environments for their use have become diversified, and higher running durability than before has been required. Probably because maintenance for VTR's has not necessarily been adequate, the need to increase the margin for running durability has arisen. Furthermore, the costs for head replacement and adjustment have been a great burden in the maintenance and management of VTR's. Thus, a demand for a magnetic recording particulate medium with a long head life, i.e., a decreased head wear has become more intense than before.

Running durability includes still life, clogging and decreased output. To improve these drawbacks, it has been customary practice to adjust the amount of an abrasive present in the surface of the magnetic layer. Methods for doing this are publicly known, and described in Japanese Unexamined Patent Publication Nos. 61-57036, 64-88917 and 9-35251.

Japanese Unexamined Patent Publication No. 61-57036 discloses a magnetic recording particulate medium having an improved abrasivity exerted on a magnetic head, the abrasivity being improved by restricting the number per unit area of abrasive particles in the surface of a magnetic layer to $0.25/100\,\mu m^2$. Japanese Unexamined Patent Publication No. 64-88917 discloses a magnetic recording particulate medium having an improved abrasivity exerted on a magnetic head, the abrasivity being improved by restricting the number per unit area of alumina particles as an abrasive in the surface of a magnetic layer to 0.25 to $0.60/100\,\mu m^2$. Japanese Unexamined Patent Publication No. 9-35251 discloses a magnetic recording particulate medium involving a head wear reduced by setting the number of exposed abrasive particles measuring $0.3\,\mu m$ or more in the surface of a magnetic layer at 3.5 or less per $100\,\mu m^2$.

Various studies have been conducted on the amount of an abrasive in the surface, but there is the problem that basically the adjustment of an abrasivity by an abrasive cannot depart from the contradictory relationship between head wear and clogging. That is, when the surface amount of the abrasive is increased to enhance an abrasivity exerted on the magnetic head, head clogging improves, but the amount of head wear becomes large, shortening the life of the head. When the surface amount of the abrasive is decreased, the amount of head wear decreases, but poor durability parameters arise, such as head clogging or increased dropouts during running. These problems including clogging are fatal troubles in systems for broadcast or computers, and a high cost for head replacement is also a major problem.

Attempts have been made to alleviate these durability drawbacks by combinations of specific magnetic materials and specific binders. These combinations are disclosed in Japanese Unexamined Patent Publication Nos. 63-103423, 63-224025, 1-159827, 7-282442 and 8-279143.

Japanese Unexamined Patent Publication No. 7-282442 describes that head wear, head stain and electromagnetic characteristics are extremely improved when a metallic magnetic powder containing a predetermined amount of Co is combined with a polyurethane having a specific structure. Japanese Unexamined Patent Publication No. 8-279143 describes that head wear, head stain and electromagnetic characteristics are extremely improved when a metallic magnetic powder containing a predetermined amount of Y is combined with a polyurethane having a specific structure. However, Co and Y are expensive themselves as materials in comparison with Fe which is used as an essential component of a ferromagnetic metal powder for a magnetic recording particulate medium. These expensive materials are difficult to use in large amounts.

Under these circumstances, it is an object of the present invention to provide a magnetic recording particulate medium having a coercive force of 1,400 to 1,700 Oe, without using an expensive material, the magnetic recording particulate medium being minimal in head wear, free from head clogging and fulfilling the desired electromagnetic characteristics.

SUMMARY OF THE INVENTION

To solve the above-described contradictory challenges of correcting head wear and head clogging, we, the inventors, have conducted extensive studies. As a result, we have found that when a combination of a specific magnetic material and a specific binder is incorporated into a magnetic layer, there can be provided a magnetic recording particulate medium minimal in head wear, free from head clogging and fulfilling the desired electromagnetic characteristics. This finding has led us to accomplish the present invention.

That is, the present invention provides a magnetic recording particulate medium having a magnetic layer on a non-magnetic support, the magnetic layer containing a ferromagnetic metal powder and a binder and having a coercive force of 1,400 to 1,700 Oe, wherein the ferromagnetic metal powder is spindle-shaped particles consisting essentially of Fe and having a Co/Fe ratio of from 1 to 5 atomic %, an Al/Fe ratio of from 5 to 15 atomic %, an average major axis length of 0.1 to 0.2 $\mu$m and a specific surface area of 40 to 50 m$^2$/g, and the binder contains a polyurethane consisting essentially of a diol component comprising a polyether polyol and a polyester polyol and a polyisocyanate component.

By so combining the ferromagnetic metal powder and polyurethane that satisfy specific conditions, there can be prepared a magnetic recording particulate medium which keeps head wear in an optimum range and holds the mechanical strength of the magnetic layer at an appropriate level, thereby ensuring running durability free from scraping of the magnetic layer, and accordingly, head clogging, and which possesses satisfactory electromagnetic characteristics.

According to preferred embodiments of the present invention, the ferromagnetic metal powder comprising spindle-shaped particles having an axial ratio of from 5 to 10 is used. Also, the ferromagnetic powder containing 1 to 10 atomic %, based on Fe, of a rare earth element such as Nd or Y is used. It is preferred that the crystallite size of the ferromagnetic metal powder be 100 to 250 Å, and the saturation magnetization of the ferromagnetic metal powder be 100 to 180 emu/g. It is also preferred to use the ferromagnetic metal powder containing 0.1 to 2.0% by weight of moisture.

According to other preferred embodiments of the present invention, the polyurethane used in the magnetic layer has a weight average molecular weight of 20,000 to 200,000 and has at least two Tg's, one of the Tg's being -250 to 10° C., preferably -200 to 10° C., and the other Tg being 40 to 130° C., preferably 45 to 110° C. The polyether polyol as one of the components of the polyurethane preferably has Tg of 0° C. or lower, has a molecular weight of 400 to 10,000, and is in the proportion of 3 to 80% by weight based on the polyurethane. The polyester polyol, one of the components of the polyurethane, preferably has a molecular weight of 400 to 10,000.

The magnetic layer preferably contains at least one abrasive and fulfills the following condition equations:

0.01 ≦ $M_{0.1}$/Mt ≦ 0.4

0.05 ≦ $H_{20-30}$/$H_{10-20}$ ≦ 0.6 where Mt designates the number per unit area (number/$\mu$m$^2$) of abrasive particles present in the surface of the magnetic layer, $M_{0.1}$ designates the number per unit area (number/$\mu$m$^2$) of abrasive particles present in the surface of the magnetic layer and having a particle diameter greater than an average particle diameter by 0.1 $\mu$m or more, $H_{10-20}$ designates the number per unit area (number/$\mu$m$^2$) of abrasive particles having a height of protrusion from the surface of the magnetic layer of 10 nm or more but less than 20 nm, and $H_{20-30}$ designates the number per unit area (number/$\mu$m$^2$) of abrasive particles having a height of protrusion from the surface of the magnetic layer of 20 nm or more but less than 30 nm.

BRIEF DESCRIPTION OF THE DRAWINGS

in which the reference numeral 1 represents a lapping tape, 2 represents a rotating roll, 3 a rotating roll, 4 a feed roll, 5 a magnetic tape, and 6 a sapphire blade.

DETAILED DESCRIPTION OF THE INVENTION

Preferred Embodiments

The ferromagnetic metal powder used in the present invention is spindle-shaped particles consisting essentially of Fe and having a Co/Fe ratio of from 1 to 5 atomic %, an Al/Fe ratio of from 5 to 15 atomic %, an average major axis length of 0.1 to 0.2 $\mu$m and a specific surface area of 40 to 50 m$^2$/g.

The ferromagnetic metal powder used in the present invention has an average major axis length in the range of from 0.1 to 0.2 $\mu$m. If the average major axis length exceeds 0.2 $\mu$m, the amount of head wear increases. This is because in case of an elongated major axis, the magnetic particles tend to be entangled, and a larger number of the magnetic particles stand up vertically from the coated surface in the coating. If the average major axis length is less than 0.1 $\mu$m, the magnetic particles become so fine that the durability deteriorates.

The ferromagnetic metal powder consisting essentially of iron is obtained by heating and reducing an oxide or a hydrous oxide consisting essentially of iron in a reducing gas. During this step, voids are formed within the particles. The degree of the voids can be grasped from a specific surface area, which is 40 to 50 m$^2$/g, preferably 42 to 48 m$^2$/g in the present invention. If the specific surface area exceeds 50 m$^2$/g, the voids in the metal powder increase in number, resulting in a high viscosity during formation into a coating composition, and thus making it difficult to obtain a paint. As a result, the surface properties of the resulting magnetic recording particulate medium deteriorate, increasing the amount of head wear. If the specific surface area is less than 40 m$^2$/g, it is difficult to obtain particles having an average major axis length of 0.2 $\mu$m or less.

Figure 1:
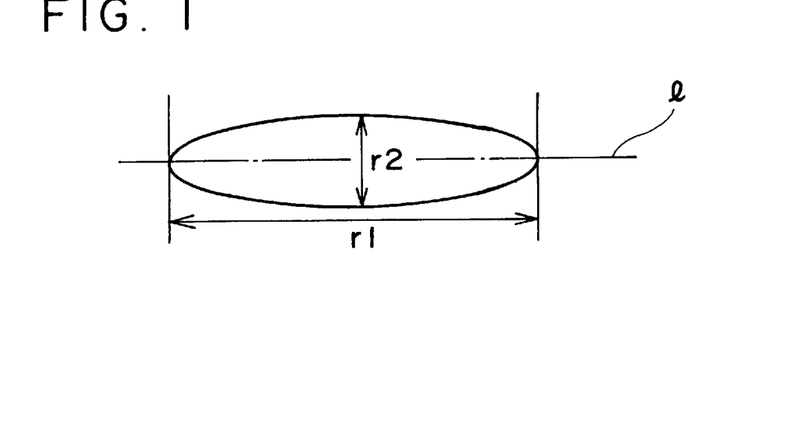
FIG. 1 is a projection drawing for illustrating the ferromagnetic powder comprising spindle-shaped particles, in which r1 denotes the major axis length of the particle, r2 denotes the minor axis length of the particle, and 1 denotes the major axis of the particle.

The ferromagnetic metal powder in the present invention comprises particles which are spindle-shaped. The "spindle-shaped" means that a figure created when the shadow of the surface of a particle is projected perpendicularly onto a plane placed parallel to a plane including the major axis of the particle takes, at least, a form as shown in FIG. 1. In FIG. 1, r1 denotes the major axis length of the particle, while r2 denotes the minor axis length of the particle. A general feature of the spindle-shaped particle lies in its shape being thick at an axial central portion in a direction normal to the major axis 1, tapering toward end portions, and closing at the end portions. The axial ratio (r1/r2) is preferably from 5 to 10.

The reason why the ferromagnetic metal powder used in the present invention comprises spindle-shaped particles is that this powder is a uniform powder with a narrow distribution of the particle sizes and minimal in branching. The use of such a powder makes it possible to improve the orientation of the particles, suppress the occurrence of particles rising vertically from inside the coated surface, and lessen the amount of head wear. Since the spindle-shaped particles have few voids, moreover, their formation into a paint is easy, thus reducing the amount of head wear.

There is no restriction on a method for producing such spindle-shaped particles, and a publicly known method can be used. An example of the method is to react an aqueous solution (preferably, pH 5 to 8) of a ferrous salt (e.g., $FeCl_2$ or $FeSO_4$) with an aqueous solution of an alkali carbonate (preferably, an aqueous solution of $(NH_4)_2CO_3$ or $Na_2CO_3$)) to obtain a suspension containing $FeCO_3$, oxidize the compound while blowing air into the suspension, perform further oxidation at a temperature above an ordinary temperature, preferably at 30 to 120° C., to form spindle-shaped goethite, then add to this suspension an aqueous solution of a Co-containing compound (e.g., cobalt sulfate or cobalt chloride), a compound containing a rare earth element such as Y or Nd (e.g., yttrium nitrate or neodymium nitrate), and an Al-containing compound (e.g., sodium aluminate or sodium metaaluminate), and mix them together, thereby preparing a spindle-shaped goethite suspension containing these compounds. The addition of the Co-containing compound is preferably performed before the addition of the rare earth element-containing compound and the Al-containing compound. The addition of the Co-containing compound to the spindle-shaped goethite containing suspension may also be performed after NaCl and NaOH are removed from the suspension by means of a filter press or the like. Then, the suspension is vacuum filtered through an Oliver filter or the like, granulated, dried and reduced. The reduction may be performed in a stationary reducing furnace or a fluidized bed reducing furnace, and is preferably performed in a steam stream at a reducing temperature controlled to about 300 to 800° C.

Then, the powder is preferably oxidized gradually in order to form an oxide layer. The gradual oxidation may be carried out by a method of immersing the powder in an organic solvent, followed by drying; a method of immersing the powder in an organic solvent, then feeding an oxygen-containing gas to form an oxide layer on the surface, and drying the powder; or a method of adjusting the partial pressures of an oxygen gas and an inert gas, without using an organic solvent, to form an oxide layer on the surface. A vapor phase reaction is preferred, because a uniform oxide layer can be formed.

According to the present invention, as described above, the amount of head wear can be decreased, mainly by restricting the shape of the ferromagnetic metal powder. This restriction alone leads to a lowered head cleaning force because of a decrease in head wear. Thus, drawbacks due to poor durability arise, such as head clogging and increased dropouts. The present invention retains durability by imparting specific formulations to the ferromagnetic metal powder and the binder as described below.

The ferromagnetic metal powder used in the present invention consists essentially of Fe and has a Co/Fe ratio of from 1 to 5 atomic % and an Al/Fe ratio of from 5 to 15 atomic %. Because of this composition, the surface characteristics of the ferromagnetic metal powder can be controlled to adsorb the binder firmly to the magnetic powder. Also, the mechanical strength of the resulting magnetic coating can be rendered high to prevent the magnetic layer itself from peeling off when the head is slid at a high speed. Furthermore, the amount of the binder adsorbed to the magnetic powder can be increased, so that the binder not adsorbed to the magnetic powder in the coating is decreased. The binder that fails to be adsorbed to the magnetic powder tends to come out onto the surface of the magnetic layer during the drying process. By decreasing the non-adsorbed binder, a trouble such as head clogging occurring upon a slide on the head can be curtailed.

Of those elements added, Al is particularly important. Al has a larger ion radius than Fe or Co, and so exists relatively near the surface of the ferromagnetic metal powder. Hence, Al can easily affect the adsorption characteristics working between the ferromagnetic metal powder and the binder, and also controls the hardness of the ferromagnetic metal powder. At a higher Al/Fe ratio, the-bond between the ferromagnetic metal powder and the binder becomes higher. When the proportion of Al exceeds 15 atomic %, however, the ferromagnetic metal powder itself becomes so hard that the amount of head wear increases. If its proportion is less than 5 atomic %, by contrast, the bond between the ferromagnetic metal powder and the binder is so low that head clogging is apt to occur.

In the ferromagnetic metal powder, the rare earth element is preferably contained in the proportion of 1 atomic % or more based on Fe. Its preferred content is 1 to 10 atomic %, more preferably 1 to 6 atomic %, and most preferably 1 to 4 atomic %. The rare earth element is used to avoid the excessive abrasion of the head and suppress stain of the head by Al or the like more reliably. This effect cannot be exhibited fully if the content of the rare earth element based on Fe is less than 1 atomic %. Its content exceeding 10 atomic % is not preferred, because it becomes difficult to control the shape of the magnetic particles.

The rare earth element may be any of Sc, Y and 15 lanthanoid elements (La, Ce, Pr, Nd, Pm, Sm, Eu, Gd, Tb, Dy, Ho, Er, Tm, Yb and Lu). The particularly preferred rare earth element is Nd and Y, of which the most preferable is Nd. For the ferromagnetic metal powder, one rare earth element may be used alone, or two or more rare earth elements may be used in combination.

The content in the ferromagnetic metal powder can be determined by the method generally used in the field of the art. For example, the content can be determined by dissolving the ferromagnetic metal powder in 6N hydrochloric acid, and analyzing the metal in the resulting solution by atomic absorption spectroscopy. Alternatively, the content can be determined by dissolving the magnetic recording particulate medium in 6N hydrochloric acid, and analyzing the resulting solution similarly by atomic absorption spectroscopy.

The ferromagnetic metal powder used in the present invention may contain, in addition to Fe, Co, Al and the rare earth element, atoms such as Si, S, Sc, Ti, V, Cr, Cu, Mo, Rh, Pd, Ag, Sn, Sb, Te, Ba, Ta, W, Re, Au, Hg, Pb, Bi, P, Mn, Zn, Ni, Mg, Ca, Sr and B. The ferromagnetic metal powder containing any such materials may be treated with a dispersant, a lubricant, a surfactant, and an antistat to be described later on, before being dispersed together with the binder.

The ferromagnetic metal powder used in the present invention may also contain a small amount of a hydroxide or an oxide.

The crystallite size of the ferromagnetic metal powder used in the present invention is usually 100 to 250 Å, preferably 120 to 220 Å, and more preferably 130 to 180 Å. The saturation magnetization ($\sigma S$) is normally about 100 to 180 emu/g, preferably 110 to 160 emu/g, and more preferably 120 to 160 emu/g. The pH is preferably optimized depending on the combination with the binder to be used. Its range is 4 to 12, preferably 7 to 11.

The ferromagnetic metal powder used in the present invention has its surface covered with an oxide layer. To form the oxide layer, there may be used any of a method of immersing the powder in an organic solvent, followed by drying; a method of immersing the powder in an organic solvent, and then feeding an oxygen-containing gas to form an oxide layer on the surface, followed by drying the powder; or a method of adjusting the partial pressures of an oxygen gas and an inert gas, without using an organic solvent, to form an oxide layer on the surface. A vapor phase reaction is preferred, because a uniform oxide layer can be formed.

The ferromagnetic metal powder used in the present invention preferably contains 0.1 to 2.0% by weight of moisture. Contact of the ferromagnetic metal powder with water or a gas containing steam gives a ferromagnetic metal powder containing moisture.

The ferromagnetic metal powder used in the present invention may be pretreated with a dispersant, a lubricant, a surfactant, and an antistat to be described later on, prior to dispersion. Concrete methods for treatment and specific examples of the treated ferromagnetic metal powder are described in Japanese Patent Publication Nos. 44-14090, 45-18372, 47-22062, 47-22513, 46-28466, 46-38755, 47-4286, 47-12422, 47-17284, 47-18509, 47-18573, 39-10307 and 48-39639, and U.S. Pat. Nos. 3026215, 3031341, 3100194, 3242005 and 3389014.

The binder used in the present invention contains a polyurethane consisting essentially of a diol component comprising a polyether polyol and a polyester polyol and a polyisocyanate component.

The polyether polyol structure may be PPG (polypropylene glycol), PTMG (polytetramethylene glycol), PEG (polyethylene glycol), an adduct of BPA (bisphenol A) with PO (propylene oxide) and/or EO (ethylene oxide), and those having a fundamental composition comprising mixtures of any of them. PPG and PTMG, in particular, are preferred.

The Tg of the polyether polyol is 0° C. or less, preferably −10 to −60° C., and its molecular weight is usually 400 to 10,000, preferably 500 to 5,000, and more preferably 800 to 3,000. The proportion of the polyether polyol in the polyurethane is normally 3 to 80% by weight, preferably 5 to 70% by weight, and more preferably 10 to 50% by weight. If its proportion is too low, the effect obtained will be low. If its proportion is too high, the mechanical strength decreases, and the durability lowers.

The polyester polyol is preferably one containing a monomer having a cyclic structure (aromatic or alicyclic) and a monomer having a branched structure. Examples of its acid component are isophthalic acid (iPA) and terephthalic acid. Preferred examples of the alcohol component are neopentyl glycol (NPG), cyclohexanedimethanol (CHM), cyclohexanediol, bisphenol A, and hydrogenated bisphenol A. The molecular weight of the polyester polyol is usually 400 to 10,000, preferably 500 to 5,000, and more preferably 800 to 3,000.

The polyurethane used in the present invention has at least two Tg's. One of the Tg's is usually −250 to 10° C., preferably −200 to 0° C., more preferably −150 to −5° C., and most preferably −10 to −40° C. The other Tg is usually 40 to 130° C., preferably 45 to 120° C., more preferably 50 to 110° C., and most preferably 60 to 100° C. In case there are three or more Tg's, two different polyester polyol components and one polyether polyol component may be used, or one polyester polyol component and two different polyether polyol components may be used. The polyurethane having 4 or more Tg's can be prepared in the same manner. The Tg's of the polyurethane are such values as to form a 20 μm thick film, and defined as the peak temperature E" according to Rheovibron (a product of Orientec).

The polyurethane used in the present invention may contain a low molecular weight polyol component, such as a publicly known chain extender, in addition to the aforementioned diol component. Concretely, a diol such as NPG, ethylene glycol (EG), 1,4-butanediol (BD) or dihydroxyethyl ether of bisphenol A, and an alcohol with three or more functional groups, such as trimethylolpropane, may be used jointly to make a polyurethane having a branched structure. These components can be incorporated in an amount of 0 to 40% by weight into the polyurethane.

As the polyisocyanate component of the polyurethane used in the present invention, an aromatic or alicyclic diisocyanate is preferred, such as tolylene diisocyanate (TDI), 4,4'-diphenylmethane diisocyanate (MDI), isophorone diisocyanate (IPDI), or hydrogenated MDI.

In the polyurethane used in the present invention, the polyether portion and the polyester portion both have blocking properties. That is, the polyurethane used in the present invention is prepared by the use of the low Tg polyether polyol component and the high Tg polyester polyol component. The low Tg polyether polyol and the high Tg polyester polyol are poorly compatible with each other. After formation into the polyurethane, they are phase separated on a microscale in the resulting coating into a low Tg, soft, easily extensible phase, and a high Tg rigid phase. This is indicated by a study of the temperature dependence of dynamic viscoelasticity which shows the appearance, at two locations, of the peaks of loss elasticity (E") and tan δ that reflect glass transition. Thus, the hard phase can retain thermal stability and strength, while the soft phase can show a marked elongation.

To enhance the running durability, it can be conceived to increase the mechanical strength of the binder. To increase the mechanical strength of the binder, it may be common practice to use a high Tg resin. Generally, when the Tg of polyurethane is raised, smoothing by a calender may become difficult, or the reactivity of the curing agent in the applied coating may decline to lower the curability, deteriorating durability. The polyurethane used in the present invention has the polyether block portion as a flowable phase, so that its calender shaping properties do not decline, nor do its curing properties deteriorate. Since the polyurethane used in the present invention has such a nature, its electromagnetic characteristics are excellent and its durability is satisfactory. The curing properties of the binder can be further improved by increasing the number of branch OH groups.

The weight average molecular weight of the polyurethane used in the present invention is usually 20,000 to 200,000, preferably 30,000 to 100,000. The yield stress of this polyurethane is usually 2 kg/mm$^2$ or more, and preferably 2.8 to 8.0 kg/mm$^2$. Its elongation at breakage is usually 100% or more, preferably 200 to 800%. Its breaking stress is usually 1 to 15 kg/cm$^2$, preferably 2 to 10 kg/cm$^2$.

Into the polyurethane, at least one polar group selected from $-SO_3M$, $-OSO_3M$, $-COOM$, $-PO_3M_2$, $-OPO_3M_2$, $-NR_2$, $-N^+R_3X^-$, $-N^+R_2R_1SO_3^-$, $-N^+R_2R_1COO^-$ (where M represents a hydrogen atom, an alkali metal ion selected from Li, K and Na, or an ammonium ion, R, $R_1$, $R_2$ and $R_3$ each represent an alkyl group with 1 to 12 carbon atoms, and X represents a halogen atom) is introduced in an amount of $1\times10^{-6}$ to $1\times10^{-3}$ eq/g, preferably, $1\times10^{-5}$ to $5\times10^{-4}$ eq/g, whereby the bond between the polyurethane and the ferromagnetic metal powder can be further increased. Moreover, the mechanical strength of the magnetic layer can be further increased, and the running durability can be further enhanced.

To introduce the polar group into the polyurethane, it is preferred that a polar group-containing aromatic polyol such as a sodium salt of bis(2-hydroxyethyl)5-sulfoisophthalate (DEIS), sodium 5-sulfoisophthalate, or an $SO_3Na$-containing polyester polyol comprising isophthalic acid, ethylene glycol or neopentyl glycol to be used together with the diol component and the polyisocyanate component of the present invention.

By using such polyurethane in combination with the aforementioned ferromagnetic metal powder, the running durability can be improved to suppress head wear.

In the magnetic layer of the magnetic recording particulate medium of the present invention, binder resins other than those enumerated above can be used jointly in the proportion of 0 to 90% by weight based on the entire binder within a range in which the binder resin is useful or exerts no adverse influence in achieving the object of the present invention. Of these publicly known resins, vinyl chloride resins, cellulose resins (nitrocellulose, cellulose acetate propionate, etc.), polyvinyl alkyral resins (polyvinyl acetal, polyvinyl butyral, etc.), phenoxy resins and polyester resins are preferred. Vinyl chloride resins are particularly preferred.

The weight ratio of vinyl chloride in the vinyl chloride resin is usually 80 to 95% by weight. If the proportion of vinyl chloride is too low, the strength decreases, and the durability declines. The degree of polymerization of the vinyl chloride resin is preferably 200 to 1,000, more preferably 250 to 500. The polar group that the vinyl chloride resin has is not restricted, but its preferred examples are OH, COOM, $SO_3M$, $OSO_3M$, $PO(OM)_2$, $OPO(OM)_2$, a tertiary amine, a quaternary ammonium salt, and an epoxy group. More Preferable examples are OH, $SO_3M$, $OSO_3M$, $PO(OM)_2$, $OPO(OM)_2$ and an epoxy group. For these examples, M denotes an alkali metal or ammonium.

The content of the polar group is preferably $1\times10^{-6}$ to $1\times10^{-3}$ eq/g. If the content is higher than this range, the viscosity will be high, lowering the dispersibility. If the content is lower than this range, the dispersibility will decline. The amount of the epoxy group that the vinyl chloride resin can contain is preferably $1\times10^{-4}$ to $1\times10^{-2}$ eq/g, and more preferably $5\times10^{-4}$ to $2\times10^{-3}$ eq/g.

The introduction of an OH group into the vinyl chloride resin is preferred, because it reacts with an isocyanate curing agent to form a crosslinked structure, enhancing the mechanical strength. The preferred way of introducing the OH group is by bonding to the polymer main chain via a hydrocarbon chain or a polyalkylene glycol chain, rather than directly bonding to the polymer main chain as with vinyl alcohol, because higher curability is obtained. The OH group is preferably secondary or primary. The introduction of the OH group into the vinyl chloride resin can be performed by copolymerization with a vinyl monomer such as 2-hydroxypropyl (meth)acrylate, 3-hydroxypropyl (meth) acrylate, 4-hydroxybutyl (meth)acrylate, or 4-hydroxybutyl allyl ether.

The OH content of the vinyl chloride resin is preferably $1\times10^{-4}$ to $5\times10^{-3}$ eq/g, and more preferably $2\times10^{-4}$ to $2\times10^{-3}$ eq/g. The vinyl chloride resin can contain another copolymerizable monomer preferably in a range of 5 to 20% by weight. Examples of such a copolymerizable monomer are (meth) acrylic acid alkyl ester, carboxylic acid vinyl ester, allyl ether, styrene, glycidyl (meth) acrylate, 3-hydroxypropyl methacrylate, 2-hydroxypropyl methacrylate, 3-hydroxypropyl allyl ether, vinyl acetate, and other vinyl monomers.

The binder used in the magnetic layer of the present invention is used in an amount within the range of 10 to 30% by weight, and preferably within the range of 15 to 25% by weight, based on the ferromagnetic powder. It is particularly preferred to use the three polymers, vinyl chloride resin, polyurethane and polyisocyanate, in combination. When these three polymers are combined, it is preferred to use the vinyl chloride resin in the range of 5 to 20% by weight, preferably 7 to 15% by weight, the polyurethane resin in the range of 2 to 15% by weight, preferably 4 to 10% by weight, and the polyisocyanate in the range of 2 to 20% by weight, preferably 3 to 10% by weight. The total amount of the three polymers is 10 to 30% by weight, preferably 15 to 25% by weight.

In the present invention, the binder is preferably cured. Polyisocyanate used as a curing agent for the purpose of curing are isocyanates such as tolylene diisocyanate, 4,4'-diphenylmethane diisocyanate, hexamethylene diisocyanate, xylene diisocyanate, naphthylene-1,5-diisocyanate, o-toluidine diisocyanate, isophorone diisocyanate, and triphenylmethane triisocyanate, the products formed by the reaction between these isocyanates and polyalcohols, and polyisocyanates produced by the condensation of isocyanates. Commercially available products as these isocyanates are Colonate L, Colonate HL, Colonate 2030, Colonate 2031, Millionate MR and Millionate MTL (made by Nippon Polyurethane Industry Co., Ltd.), Takenate D-102, Takenate D-110N, Takenate D-200 and Takenate D-202 (made by Takeda Chemical Industries, Ltd.), Desmodule L, Desmodule IL, Desmodule N and Desmodule HL (made by Sumitomo Bayer Co.), and Burnock D502 (made by DAINIPPON INK & CHEMICALS, INC.). These may be used alone, or in combination of two or more with their difference in curing reactivity being utilized.

In the magnetic layer of the present invention, powders such as carbon black and abrasives can be used. As the carbon black for use in the present invention, furnace black for rubber, thermal black for rubber, black for color, or acetylene black can be exemplified. The carbon black preferably has a specific surface area of 5 to 500 m$^2$/g, a DBP oil absorption of 10 to 400 ml/100 g, a particle size of 5 to 300 µu, a pH of 2 to 10, a moisture content of 0.1 to 10%, and a tap density of 0.1 to 1.0 g/ml. Concrete examples of the carbon black are BLACKPEARLS 2000, 1300, 1000, 900, 800 and 700 (products of Cabot Corp.), XC-72 (VULCAN), #80, #60, #55, #50 and #35 (Asahi Carbon Co.), #2400, #2300, #5, #900, #950, #970, #1000, #30, #40 and #10B (Mitsubishi Chemical Corp.), and CONDUCTEX SC and RAVEN 150, 50, 40 and 15 (Columbia Carbon Co.). It is also permissible to use the carbon black which has been surface treated with a dispersant or grafted with a resin, or the carbon black whose surface has been partly graphitized. The carbon black may be dispersed with the binder before being added to the magnetic paint. These carbon blacks may be used alone or in combination. When the carbon black is used, it is preferably used in an amount of 0.1 to 30% based on the ferromagnetic metal powder. The carbon black is effective in preventing the static electricity of the magnetic layer, reducing the coefficient of friction, imparting light screening properties, and improving the film strength. These properties differ according to the type of the carbon black used. Thus, the carbon blacks used in the present invention can, if desired, be changed in kind, amount or combination, and can be used differently according to the purpose on the basis of the aforementioned properties such as particle size, oil absorption, electrical conductivity and pH. For the carbon black that can be used in the magnetic layer of the present invention, "A Handbook of Carbon Black" edited by the Carbon Black Association, for example, can be consulted.

The abrasive used in the magnetic layer of the present invention will be described. As the abrasive, an inorganic nonmagnetic powder can be used. The inorganic nonmagnetic powder can be selected from inorganic compounds such as metal oxides, metal carbonates, metal sulfates, metal nitrides, metal carbides and metal sulfides. Examples of the inorganic compounds are α-alumina with an α-conversion rate of 90 to 100%, β-alumina, γ-alumina, silicon carbide, chromium oxide, cerium oxide, α-iron oxide, corundum, siliconnitride, titaniumcarbide, titaniumoxide, silicon dioxide, tin oxide, magnesium oxide, tungsten oxide, zirconium oxide, boron nitride, zinc oxide, barium sulfate, and molybdenum disulfide. These binders may be used alone or in combination. Particularly preferred are α-alumina, red oxide and chromium oxide. Calcium carbonate is not preferred, since it becomes a supply source for water-soluble metallic ions.

The average particle size of the abrasive present in the surface of the magnetic layer is preferably 0.05 to 0.4 μm, more preferably 0.1 to 0.3 μm. If the average particle size is smaller than this range, it is difficult to disperse the abrasive. Thus, when the magnetic tape is run, powder falling is apt to occur. If the average particle size is larger than this range, on the other hand, the surface properties deteriorate, and the electromagnetic characteristics become poor.

In the abrasive present in the surface of the magnetic layer according to the present invention, the presence ratio of particles with a particle diameter greater than the average particle diameter by 0.1 μ or more (i.e., $M_{0.1}/Mt$) is preferably 0.01 to 0.4, namely, 1% to 40%. A more preferable range of $M_{0.1}/Mt$ is 0.05 to 0.3, and the most preferable range is 0.1 to 0.2. An $M_{0.1}/Mt$ set at 0.01 or higher makes the running durability better. In a low temperature, low humidity environment, in particular, clogging and dropout can be suppressed effectively. The $M_{0.1}/Mt$ set at 0.4 or lower can decrease the frequency of the abrasive peeling off, inhibit dropout during repeated runs, and reduce scratches on the surface of the magnetic layer.

Head wear is closely related to the heights of protrusion of the abrasive from the surface of the magnetic layer, rather than to the two-dimensional size of the abrasive. By reducing high protrusions, and forming many low protrusions, head wear can be reduced more effectively. Let the number, per unit area, of abrasive particles having a height of 10 nm or more but less than 20 nm among all the abrasive particles present in the surface of the magnetic layer be $H_{10-20}$, and the number, per unit area, of abrasive particles having a height of 20 nm or more but less than 30 nm among all the abrasive particles be $H_{20-30}$. When $0.05 \leq H_{20-30}/H_{10-20} \leq 0.6$, better running durability can be ensured with less head wear. A more preferred relationship is $0.15 \leq H_{20-30}/H_{10-20} \leq 0.4$. A high $H_{20-30}/H_{10-20}$ ratio would tend to increase high protrusions, intensifying head wear, making the spacing loss large, and deteriorating the electromagnetic characteristics. With a $H_{20-30}/H_{10-20}$ ratio of lower than 0.05, there will be so many low protrusions that the packing density of the magnetic material in the surface of the magnetic layer tends to lower, deteriorating the electromagnetic characteristics. In particular, there will be a tendency toward marked deterioration of linear audio signals or control signals in a relatively low region.

The total number of the abrasive particles in the surface of the magnetic layer (i.e., Mt) is preferably 0.1 to 1.0/μm², and more preferably 0.2 to 0.6/μm². With a larger Mt, the packing density of the magnetic material in the surface of the magnetic layer lowers, deteriorating the electromagnetic characteristics. With a smaller Mt, the surface of the magnetic layer can be easily scratched, deteriorating the still life characteristics, in particular.

By so restricting the size distribution and the height distribution of the abrasive particles present in the surface of the magnetic layer to specific ranges, further improvements can be achieved in head wear and running durability.

The average particle diameter and the particle diameter distribution of the abrasive present in the surface of the magnetic layer in the present invention are measured in the following manner:

The surface of the magnetic layer is photographed using a scanning electron microscope (SEM). To discern fine abrasive particles, the desired magnification at shooting is about 5,000 to 50,000 times. There is a fear that the density of the abrasive particles present in the magnetic layer may vary with location. Thus, it is preferred to choose the location of shooting randomly for each sample, and take pictures in 10 or more fields of view, preferably 20 or more fields of view so that 200 or more abrasive particles will be included. From the SEM pictures taken, whether the objects shot are abrasive particles or not can be judged usually from their shapes. A more accurate judgment can be made by performing EPMA (electron probe X-ray microanalyzer) analysis jointly with SEM photography. That is, the strict judgment can be rendered in the light of the amount of the Al element detected when the abrasive is $Al_2O_3$, the amount of the Cr element detected when the abrasive is $Cr_2O_3$, or the amount of the Si element detected when the abrasive is SiC or $SiO_2$. From the so taken SEM photographs, the contours of the abrasive particles are marked. The marked contours are subjected to an ordinary image analyzer to input the shapes of the abrasive particles in a digitized manner, thereby determining the distribution of the particle sizes.

In the present invention, the heights of protrusion distribution of the abrasive is determined by means of an atomic force microscope (AFM). Whether the protrusions are due to the abrasive or not can be judged by a combination of AFM and the above-described EPMA analysis.

In the present invention, the average particle diameter and the particle size distribution of the abrasive present in the surface of the magnetic layer can be controlled, for example, by the following methods, but the available methods are not restricted thereto:

1) Adjustment of the particle size distribution of the abrasive itself:

The average particle diameter and the particle size distribution of the abrasive can be controlled by publicly known methods. The particle size distribution is closely related to the method of producing the abrasive. For example, an abrasive produced from a solution by a crystal precipitation step is generally narrow in particle size distribution. An abrasive formed from a bulk by a pulverization process tends to be wide in particle size distribution despite the average particle diameter.

2) Combination of two or more abrasives:

If two or more abrasives different in average particle diameter and particle size distribution are used jointly, the medium particle diameter and particle size distribution can be controlled according to their mixture ratio.

3) Dispersing conditions for the abrasive:

There are known methods, one of which comprises dispersing the abrasive with the binder and a solvent, adding the dispersion to an abrasive-free magnetic solution, and mixing and dispersing these materials to prepare a magnetic paint. The other method comprises dispersing the abrasive, the binder and a solvent beforehand, mixing a separately prepared magnetic dispersion containing no abrasive with the resulting dispersion, and if desired, further dispersing the mixture to prepare a magnetic paint. The control of the dispersing conditions for the abrasive, e.g., adjustment of the dispersing time, use of a powerful dispersing machine, or adjustment of the size or specific gravity of a dispersing medium, makes it possible to adjust the average particle diameter and the particle size distribution of the abrasive in the magnetic layer.

To control the heights of protrusion distribution of the abrasive, the following methods are exemplified:

1) Binder when dispersing the abrasive:

For dispersion, a method is available which comprises dispersing the abrasive with the binder and a solvent, adding the dispersion to an abrasive-free magnetic solution, and mixing and dispersing these materials to prepare a magnetic paint. Another available method comprises dispersing the abrasive, the binder and a solvent beforehand, mixing a separately prepared magnetic dispersion containing no abrasive with the resulting dispersion, and if desired, further dispersing the mixture to prepare a magnetic paint. In either method, the compatibility between the binder for dispersion of the abrasive and the binder in the magnetic solution containing no abrasive is made high or low. If the compatibility is high, the movement of the abrasive particles during the coating and drying of the magnetic layer can be inhibited to make the heights of protrusion of the abrasive small. If the compatibility is low, the heights of protrusion of the abrasive can be made large.

2) Vigorous pushing by the calender:

The surface of the magnetic layer is shaped by means of a hard roll, such as a metallic roll, at a high pressure and a high temperature to push the high abrasive protrusions into the magnetic layer. The linear pressure is 200 to 450 kg/cm, preferably 250 to 400 kg/cm, and the treating temperature is 70 to 110° C., preferably 80 to 100° C. The treating rate is 50 to 400 m/min, preferably 80 to 300 m/min. If the linear pressure and the treating temperature are much higher than the above ranges or the treating rate is much lower than the above range, the ratio $H_{20-30}/H_{10-20}$ becomes low, thus deteriorating the running durability. If the linear pressure and the treating temperature are much lower than the above ranges or the treating rate is much higher than the above range, the ratio $H_{20-30}/H_{10-20}$ becomes high, thus increasing the amount of head wear.

3) Adjustment of the binder:

The type and the proportion of the binder in the magnetic layer are adjusted to lower the Tg of the magnetic layer before calendering. In this case, the ratio $H_{20-30}/H_{10-20}$ becomes low even when calendering is performed under the same conditions. If the amount of the binder based on the magnetic material is moderately decreased to such a degree as not to impair dispersing, the voids of the magnetic layer before calendering increase in number. In this case, the ratio $H_{20-30}/H_{10-20}$ can be made low even when calendering is performed under the same conditions.

4) Kneading conditions:

In preparing a magnetic paint, it is common practice to carry out a kneading treatment of the magnetic material, the binder and a small amount of a solvent with a strong shear force by means of a device such as a kneader. The kneading treatment increases the adsorbability of the magnetic material and the binder to each other, thus increasing the packing density of the magnetic layer and making the strength of the magnetic layer high. Vigorous kneading increases the packing density, but the voids of the magnetic layer after coating decrease. Thus, calendering becomes difficult, making the ratio $H_{20-30/H10-20}$ high.

Figure 2:
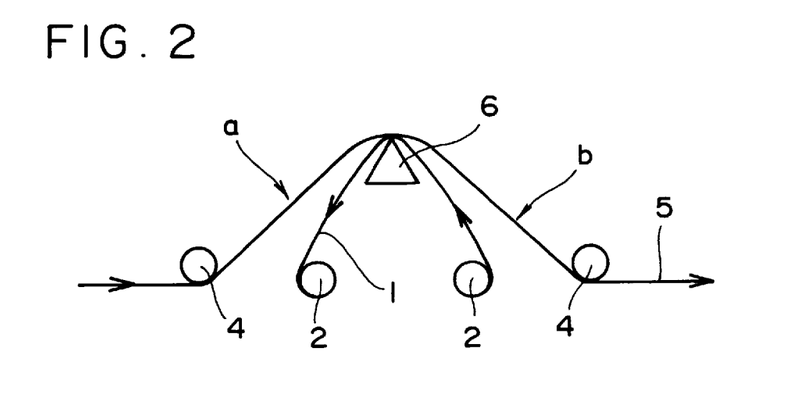
FIG. 2 is a concept diagram of a blade treating device using an LTBL system.

5) Blade treatment:

The resulting magnetic tape is lapped with an abrasive tape, or lapped with a rotating roll studded with a hard powder such as a diamond powder to polish the magnetic layer or top-cut the protrusions of the abrasive. Concretely, the following conditions are preferred for a system of blading by lapping with an abrasive tape (LTBL system), and a system of blading by lapping with a diamond powder-studded rotating roll (DWBL system): FIG. 2 is a concept view of an apparatus using the LTBL system. A magnetic tape 5 that has been carried is passed over a feed roll 4, and fed onto a sapphire blade 6 for polishing. Then, it is fed past a feed roll 4 and taken up to complete its treatment. Between the sapphire blade 6 and the magnetic tape 5, a lapping tape 1 is conveyed by rotating rolls 2 in a direction opposite to the travel of the magnetic tape 5. This system is described in detail in Japanese Unexamined Patent Publication No. 63-259830.

The LTBL system can employ K-10000, MA-20000 or MS20000, a product of Fuji Photo Film Co., Ltd., as a lapping tape. Preferably, the carriage speed of the magnetic tape (V) is set at 3 to 20 m/sec, while the carriage speed of the lapping tape (v) is set at 10 to 50 mm/min. Preferably, the tension (T1) of the magnetic tape at site a in FIG. 2 is set to be in the range of from 30 to 50 g/(½ inch width), while the tension (T2) of the magnetic tape at site b in FIG. 2 is set to be in the range of from 100 to 200 g/(½ inch width), with the difference in tension (T2–T1) being set to be within the range of 50 to 150 g/(½ inch width).

Figure 3:
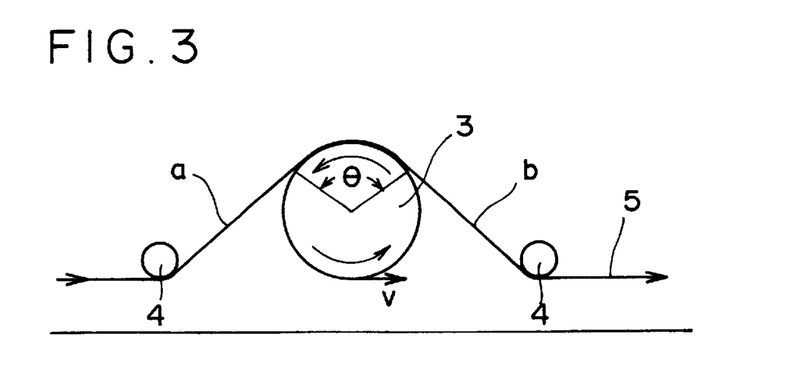
FIG. 3 is a concept diagram of a blade treating device using a DWBL system.

FIG. 3 is a concept view of an apparatus using the DWBL system. A magnetic tape 5 that has been carried is passed over a feed roll 4, and fed onto a rotating roll 3 studded with a diamond powder for polishing. Then, it is fed past a feed roll 4 and taken up to complete its treatment. The rotating roll 3 rotates in a direction opposite to the travel of the magnetic tape 5. This system is described in detail in Japanese Unexamined Patent Publication No. 62-172532.

As the rotating roll 3 used in the DWBL system, DW#600, #800 or #1000 of Oriental Diamond Industries Research Institute (diameter: 7 cm, lapping angle (θ): 90°, Ra of #800: 0.5–1.3 μm), for example, can be used. Preferably, the carriage speed (V) of the magnetic tape and the tangential speed (v) of the rotating roll 3 are set at 3 to 7 m/sec. Preferably, the tension (T1) of the magnetic tape at site a in FIG. 3 is set in the range of from 30 to 150 g/ (½ inch width), while the tension (T2) of the magnetic tape at site b in FIG. 3 is set in the range of from 100 to 300 g/ (½ inch width), with the difference in tension (T2–T1) being set to be within the range of 50 to 200 g/(½ inch width).

When only one abrasive is used in the present invention, the particle diameter of the abrasive used in the invention is preferably that with an average particle diameter of 0.05 to 0.4 μm, more preferably, that with an average particle diameter of 0.1 to 0.3 μm. It is preferred that particles with a particle diameter larger than the average particle diameter by 0.1 μm or more be present in the proportion of 1 to 40%, more preferably 5 to 30%, most preferably 10 to 20%. The particle size of this abrasive used alone affects, but does not equal, the actual particle size of abrasive particles present in the surface of the magnetic layer. The particle size of abrasive particles present in the surface of the magnetic layer varies with the dispersing conditions for the abrasive, and so forth. Furthermore, some particles easily appear, but other particles appear with difficulty, on the surface of the magnetic layer during the coating and drying steps.

Two or more abrasives with different average particle diameters may be used in combination. In this case, the average particle diameter and the proportion of the particles with a particle diameter larger than the average particle diameter by 0.1 μm or more can be set to be within the above-mentioned ranges, expressed as the weighted averages according to the actual proportions of the two or more abrasives used. The dispersing conditions for the two abrasives can be changed to control their particle sizes. For instance, abrasive A is dispersed with the binder and a solvent beforehand. Abrasive B in the unchanged powdery form is added to a separately prepared kneaded solution of the ferromagnetic metal powder kneaded with the binder and a solvent. Then, the dispersion and the mixture are dispersed, whereby the dispersing conditions can be distinguished between the abrasive A and the abrasive B. That is, the abrasive A is dispersed more vigorously than is the abrasive B.

The tap density of the abrasive powder is 0.05 to 2 g/ml, preferably 0.2 to 1.5 g/ml. The moisture content of the abrasive powder is 0.05 to 5% by weight, preferably 0.2 to 3% by weight. The specific surface area of the abrasive is 1 to 100 $m^2$/g, preferably 5 to 50 $m^2$/g. Its oil absorption determined using DBP is 5 to 100 ml/100 g, preferably 10 to 80 ml/100 g. The specific gravity is 1 to 12, preferably 3 to 6. The shape of the abrasive may be acicular, spherical, polyhedral, or plate-like.

The surface of the abrasive may be coated at least partially with a compound which is different from the essential component of the abrasive. Examples of the compound are $Al_2O_3$, $SiO_2$, $TiO_2$, $ZrO_2$, $SnO_2$, $Sb_2O_3$, and ZnO. The use of $Al_2O_3$, $SiO_2$, $TiO_2$ or $ZrO_2$, in particular, give better dispersibility. These compounds may be used in combination or alone.

Concrete examples of the abrasive powder for use in the magnetic layer of the present invention are Nanotite (Showa Denko K.K.); Hit 100, Hit 82, Hit 80, Hit 70, Hit 60A, Hit 55, AKP20, AKP30, AKP50 and ZA-G1 (SUMITOMO CHEMICAL CO., LTD.); ERC-DBM, HP-DBM, HPF-DBM, HPFX-DBM, HPS-DBM and HPSX-DBM (Reynolds Chemicals); WA8000 and WA10000 (FUJIMI INC.); UB20, UB40B and Mechanocks U4 (Kamimura Kogyo Co.); UA2055, UA5155 and UA5305 (Showa Light Metals Co.); G-5, Chromex M, Chromex S1, Chromex U2, Chromex U1, Chromex X10 and Chromex KX10 (Nippon Chemical Industrial Co., Ltd.); ND803, ND802 and ND801 (Nippon Denko Co., Ltd.); F-1, F-2 and UF-500 (TOSO CO., LTD.); DPN-250, DPN-250BX, DPN-245, DPN-270BX, TF-100, TF-120, TF-140, DPN-550BX and TF-180 (TODA KOGYO CORP.); A-3 and B-3 (Showa Mining Co., Ltd.); Beta SiC and UF (Central Glass Co., Ltd.); Beta Random Standard and Beta Random Ultrafine (IBIDEN CO., LTD.); JR401 and MT500B (Teikoku Kako Co.); TY-50, TTO-51B, TTO-55A, TTO-55B, TTO-55C, TTO-55S, TTO-55D, SN-100, E270 AND E271 (ISHIHARA SANGYO KAISHA, LTD.); STT-4D, STT-30D, STT-30 and STT-65C (Titan Kogyo K.K.); MT-100S, MT-100T, MT-150W, MT-500B, MT-600B, MT-100F and MT-500HD (Teika Co.); FINEX-25, BF-1, BF-10, BF-20 and ST-M (SAKAI CHEMICAL INDUSTRY CO., LTD.); HZn, $HZr_3M$ (Hokkai Kagaku Co.); DEFIC-Y and DEFIC-R (DOWA MINING CO., LTD.); $AS_2BM$ and $TiO_2P_{25}$ (Nippon Aerosil); 100A and 500A (Ube Industries, Ltd.); and Y-LOP and its calcination product (Titan Kogyo K.K.).

In the present invention, additives having a lubricating effect, an antistatic effect, a dispersing effect, or a plasticizing effect can be used. Examples of the additives are molybdenumdisulfide, tungstendisulfide, graphite, boronnitride, graphite fluoride, silicone oils, silicones having a polar group, fatty acid modified silicones, fluorine-containing silicones, fluorine-containing alcohols, fluorine-containing esters, polyolefins, polyglycols, alkyl phosphoric esters and their alkali metal salts, alkylsulfuric esters and their alkali metal salts, polyphenyl ethers, fluorine-containing alkylsulfuric esters and their alkali metal salts, monobasic fatty acids having a carbon number of 10 to 24 (optionally containing an unsaturated bond, or being branched) and their metal salts (Li, Na, K, Cu, etc.), monohydric, dihydric, trihydric, tetrahydric, pentahydric, and hexahydric alcohols having a carbon number of 12 to 22 (optionally containing an unsaturated bond, or being branched), alkoxyalcohols having a carbon number of 12 to 22, monofatty acid esters or difatty acid esters or trifatty acid esters comprising any one of monobasic fatty acids having a carbon number of 10 to 24 (optionally containing an unsaturated bond, or being branched) with any one of monohydric, dihydric, trihydric, tetrahydric, pentahydric, and hexahydric alcohols having a carbon number of 2 to 12 (optionally containing an unsaturated bond, or being branched), fatty acid esters of monoalkyl ethers of alkylene oxide polymerizates, fatty acid amides having a carbon number of 8 to 22, and aliphatic amines having a carbon number of 8 to 22. Concrete examples of the above compounds are lauric acid, myristic acid, palmitic acid, stearic acid, behenic acid, butyl stearate, oleic acid, linoleic acid, linolenic acid, elaidic acid, octyl stearate, amyl stearate, isooctyl stearate, octyl myristate, butoxyethyl stearate, anhydrosorbitan monostearate, anhydrosorbitan distearate, anhydrosorbitan tristearate, oleyl alcohol, and lauryl alcohol. Other examples are nonionic surfactants such as alkylene oxide derived compounds, glycerin derived compounds, glycidol derived compounds, or alkylphenolethylene oxide adducts; cationic surfactants such as cyclic amines, ester amides, quaternary ammonium salts, hydantoin derivatives, heterocyclic compounds, phosphonium compounds or sulfonium compounds; anionic surfactants containing an acidic group such as carboxylic acid group, sulfonic acid group, phosphoric acid group, sulfuric ester group, or phosphoric ester group; and amphoteric surfactants such as amino acids, aminosulfonic acids, sulfuric or phosphoric esters of aminoalcohols, or alkylbetaine type compounds. These surfactants are described in detail in "A Guide to Surfactants" (published by Sangyo Tosho Co.). These lubricants, antistatic agents, and so on need not be 100% pure, but may contain impure components, such as isomers, unreacted substances, side reaction products, degradation products, or oxides, in addition to the main ingredient. The content of each of these impurities is preferably 30% or less, and more preferably 10% or less.

In the present invention, the types and amounts of these lubricants and surfactants can be used differently according to the needs. For example, exudation onto the surface can be controlled by the use of fatty acids with different melting points, or by using esters different in boiling point or polarity. Alternatively, the stability of a coating step can be enhanced by adjusting the amount of the surfactant. However, these adjustments are not restrictive.

All or some of the additives used in the present invention may be added at any stage of the manufacturing process for the magnetic paint. For instance, they may be mixed with the ferromagnetic powder before a kneading step; or added at a kneading step for kneading the ferromagnetic powder and the binder together with a solvent; or added at a dispersing step; or added after dispersing; or added immediately before coating. According to the object to be attained, all or some of the additives are coated simultaneously or sequentially after the coating of the magnetic layer, whereby the intended object can be achieved. According to the object, the lubricant may be coated on the surface of the magnetic layer after calendering or slitting.

Examples of the commercially available lubricants used in the present invention are NAA-102, NAA-415, NAA-312, NAA-160, NAA-180, NAA-174, NAA-175, NAA-222, NAA-34, NAA-35, NAA-171, NAA-122, NAA-142, NAA-160, NAA-173K, hydrogenated castor oil fatty acid, NAA-42, NAA-44, Cation SA, Cation MA, Cation AB, Cation BB, Nymeen L-201, Nymeen L-202, Nymeen S-202, Nonion E-208, Nonion P-208, Nonion S-207, Nonion K-204, Nonion NS-202, Nonion NS-210, Nonion HS-206, Nonion L-2, Nonion S-2, Nonion S-4, Nonion 0-2, Nonion LP-20R, Nonion PP-40R, Nonion SP-60R, Nonion OP-80R, Nonion OP-85R, Nonion LT-221, Nonion ST-221, Nonion OT-221, Monoguri MB, Nonion DS-60, Anon BF, Anon LG, butyl stearate, butyl laurate, and erucic acid (made by NOF Corp.), oleic acid made by Kanto Chemical Co. Ltd., FAL-205, FAL-123 and Pionin E-818 (made by Takemoto Oil and Fat Co., Ltd.), Enujerubu LO, Enujerubu IPM, and Sansosyzer E4030 (made by New Japanese Chemical Co., Ltd.), TA-3, KF-96, KF-96L, KF96H, KF410, KF420, KF965, KF54, KF50, KF56, KF907, KF851, X-22-819, X-22-822, KF905, KF700, KF393, KF-857, KF-860, KF-865, X-22-980, KF-101, KF-102, KF-103, X-22-3710, X-22-3715, KF-910, and KF-3935 (made by Shin-Etsu Chemical Co., Ltd.), Armaid P, Armaid C, and Armoslip CP (made by Lion Armour Co.), Duomine TDO made by Lion Corp., BA-41G made by THE NISSHIN OIL MILLS, LTD., Profan 2012E, Newpole PE61, Ionet MS-400, Ionet MO-200, Ionet DL-200, Ionet DS-300, Ionet DS-1000, and Ionet DO-200 (made by SANYO CHEMICAL INDUSTRIES, LTD.).

The use of an organophosphorus compound having a molecular weight of 300 or less as the additive, moreover, can further enhance the force and amount of bond between the ferromagnetic metal powder and the binder, making dispersion better, reducing the amount of head wear, and further decreasing the amount of the binder not adsorbed to the ferromagnetic metal powder. Thus, the durability of the magnetic recording particulate medium can be enhanced marvelously.

Examples of the organophosphorus compound are described in Japanese Unexamined Patent Publication No. 1-189025, including phenylphosphoric acid $C_6H_5OPO(OH)_2$, n-butyl phosphate $n-C_4H_9OPO(OH)_2$, dibutyl phosphite $(C_4H_9O)_2P(OH)$, and phenylphosphonic acid $C_6H_5PO(OH)_2$.

The thickness configuration of the magnetic recording particulate medium of the present invention is such that the thicknesses of the respective members are usually 1 to 100 $\mu$m, preferably 4 to 12 $\mu$m, for the nonmagnetic support, usually 0.1 to 5 $\mu$m, preferably 1 to 4 $\mu$m, for the magnetic layer, usually 0.1 to 2 $\mu$m, preferably 0.4 to 1 $\mu$m, for the backcoat layer, and 0.01 to 2 $\mu$m, preferably 0.02 to 0.5 $\mu$m, for the adhesive layer sandwiched between the nonmagnetic support and the magnetic layer for improving adhesion. As the adhesive layer and backcoat layer, publicly known materials can be used.

As the nonmagnetic support used in the present invention, there can be exemplified publicly known films of polyethylene terephthalate, polyethylene naphthalate, polyamides, polyimides, polyamideimides, aromatic polyamides, and polybenzoxydazoles. Especially, the nonmagnetic support using polyethylene terephthalate, polyethylene naphthalate, or aramid resin is preferred.

These nonmagnetic supports may be subjected beforehand to corona discharge treatment, plasma treatment, treatment for enhancing adhesion, heat treatment, or dust removal. To attain the object of the present invention, the surface roughness of the nonmagnetic support needs to be 2 to 30 nm, preferably 5 to 25 nm, more preferably 10 to 20 nm. The nonmagnetic support preferably not only has small center line average surface roughness, but is also free from bulky protrusions measuring 1 $\mu$m or larger. The surface roughness can be controlled freely by the size and amount of a filler to be added, where necessary, to the nonmagnetic support. Examples of the filler are oxides or carbonates of Al, Ca, Si and Ti (whether crystalline or amorphous), as well as fine organic powders of acrylic resins or melamine resins. To fulfill the requirement for running durability as well as the surface roughness, the roughness of the surface to be coated with the backcoat layer is preferably greater than the roughness of the surface to be coated with the magnetic layer.

The magnetic layer-coated surface and the backcoat layer-coated surface of the nonmagnetic support may be the same or different in surface roughness. To vary the roughness, a dual-structure support may be used. Alternatively, the roughness may be varied by providing a coating layer.

The F-5 value of the nonmagnetic support used in the present invention is preferably 7 to 30 kg/mm$^2$ in the tape running direction as well as in the tape width direction. Generally, the F-5 value in the tape length direction is higher than the F-5 value in the tape width direction, but this is not the case particularly when the strength in the width direction needs to be increased. The thermal shrinkage of the nonmagnetic support in the tape running direction and the tape width direction under the conditions 100° C. and 30 minutes is preferably 3% or less, more preferably 1.5% or less. Its thermal shrinkage upon treatment for 30 minutes at 80° C. is preferably 1% or less, more preferably 0.5% or less. Preferably, the break strength of the nonmagnetic support in either direction is 5 to 100 kg/mm$^2$, and its modulus of elasticity is 100 to 2,000 kg/mm$^2$. The light transmittance of the magnetic recording particulate medium at 900 nm is preferably 30% or less, more preferably 3% or less.

To attain the object of the present invention, a publicly known manufacturing technique is employed. That is, a magnetic paint is produced, coated on the nonmagnetic support, oriented, dried, then surface smoothed, and cut to a predetermined width to obtain a magnetic recording particulate medium.

The magnetic paint is prepared by kneading and dispersing the components such as the ferromagnetic powder, binder, carbon black, abrasive, antistat and lubricant, usually together with a solvent. Usable as the solvent for kneading and dispersing is a solvent such as methyl ethyl ketone, toluene, butyl acetate or cyclohexanone which is usually used for the preparation of a magnetic paint. The method of kneading and dispersing is not restricted, as long as it is in general use for the preparation of a magnetic paint. The order of adding the components can be set suitably. Some of the components may be dispersed beforehand, and then added. Alternatively, the components may be dispersed separately, and finally mixed.

For the preparation of the magnetic paint, an ordinary kneader can be used, such as two roll mill, three roll mill, ball mill, sand grinder, attritor, high speed impeller dispersing machine, high speed stone mill, high speed impact mill, Disper, kneader, high speed mixer, homogenizer, or ultrasonic dispersing machine. Details of the kneading and dispersing technology are described in T. C. Patton "Paint Flow and Pigment Dispersion" (John Wiley & Sons, 1964) or Shinichi Tanaka, "Kogyo Zairyo" (Industrial Materials), vol. 25, page 37 (1977). Relevant descriptions are present in U.S. Pat. Nos. 2581414 and 2855515. In the present invention, kneading and dispersing can be performed in accordance with the method described in these citations to prepare a magnetic paint.

The resulting magnetic paint is coated on the aforementioned nonmagnetic support so that the dry thickness of the resulting magnetic layer will be 0.05 to 10 $\mu$m, more preferably 0.2 to 5.0 $\mu$m. For a multi-layered structure, a plurality of magnetic paints may be coated sequentially or simultaneously in plural layers. The coating method for coating of the magnetic paint may be air doctor coating, blade coating, rod coating, extrusion coating, air knife coating, squeeze coating, impregnation coating, reverse roll coating, transfer roll coating, gravure coating, kiss coating, cast coating, spray coating, or spin coating. For these techniques, reference can be made to "Latest Coating Technologies" (May 31, 1983) published by "Sogo Gijutsu Center" (Comprehensive Technology Center).

The coated layer of the magnetic paint is dried after the ferromagnetic powder contained in the coating of the magnetic paint is oriented in a magnetic field. The magnetic field orientation is performed preferably by jointly using a solenoid of 1,000 G or more and a cobalt magnet of 2,000 G or more with the same poles being opposed to each other. It is also preferred to provide a moderate drying step before orientation so that the orientation properties after drying will be the highest.

The surface of the nonmagnetic support that has not been coated with the magnetic paint may be provided with a backcoat layer. Usually, the backcoat layer is provided by coating a backcoat layer forming paint, which comprises particulate components, such as the abrasive, antistat and binder dispersed in an organic solvent, onto the surface of the nonmagnetic support that has not been coated with the magnetic paint. The surfaces of the nonmagnetic support which are to receive the magnetic paint and the backcoat layer forming paint may be each provided with an adhesive layer.

The application of the backcoat layer is preferably carried out after the application and drying of the magnetic layer. However, its application may be performed before the application of the magnetic layer or after a surface smoothing treatment to be described below.

After the formation and drying of the coated layer, surface smoothing treatment is performed. For this treatment, a supercalender roll, for example, is utilized. By performing the surface smoothing treatment, voids produced by the removal of the solvent during drying vanish, and the packing density of the ferromagnetic powder in the magnetic layer increases. Thus, a magnetic recording particulate medium with high electromagnetic characteristics can be obtained. As calender rolls, there are used various metal rolls, or plastic rolls having heat resistance which are formed from a plastic material such as epoxy, polyimide, polyamide or polyimideamide. The temperature of the calender roll for the calendering treatment is 60 to 150° C., preferably 70 to 130° C., and more preferably 80 to 110° C. The calendering pressure is 100 to 500 kg/cm, preferably 200 to 450 kg/cm, and more preferably 250 to 400 kg/cm.

After calendering, thermo treatment may be performed. The thermo treatment can be carried out for 6 to 120 hours at 40 to 80° C.

Then, the treated material is cut into a desired width by means of a cutter such as a slitter. After or before cutting, the surface of the magnetic layer can be blade treated with a sapphire blade or the like.

The magnetic characteristics of the magnetic recording particulate medium according to the present invention are as follows: The squareness ratio in the tape running direction when measured at a magnetic field of 10 kOe by the use of VSM (vibration sample magnetometer) is 0.70 or above, preferably 0.75 or above, more preferably 0.80 or above. The squareness ratios in two directions perpendicular to the tape running direction are preferably not more than 80% of the squareness ratio in the running direction. The SFD of the magnetic layer is preferably 0.7 or less, and more preferably 0.6 or less.

The surface roughness of the magnetic layer, Ra, is preferably 1 to 10 nm, but its value should beset suitably according to the purpose. To better the electromagnetic characteristics, a smaller Ra is preferred. To improve the running durability, on the other hand, a larger Rs is preferred. The RMS surface roughness ($R_{RMS}$) determined based on evaluation using AFM is preferably 2 to 15 nm.

The coefficient of friction (SUS420J) of the magnetic layer surface and the opposite surface thereto in the magnetic recording particulate medium of the present invention is preferably 0.1 to 0.5, more preferably 0.2 to 0.3. The surface resistivity is preferably $10^4$ to $10^{12}$ $\Omega$/sq. The modulus of elasticity at 0.5% elongation of the magnetic layer is preferably 100 to 2,000 kg/mm$^2$ in both of the running direction and the width direction. The break strength is preferably 1 to 30 kg/cm$^2$. The modulus of elasticity of the magnetic recording particulate medium is preferably 100 to 1,500 kg/mm$^2$ in both of the running direction and the width direction. The residual elongation is preferably 0.5% or less. The thermal shrinkage at every temperature lower than 100° C. is preferably 1% or less, more preferably 0.5% or less, most preferably 0.1% or less, and ideally 0%. The glass transition temperature of the magnetic layer (the peak point of the loss elasticity in the dynamic viscoelasticity measurements at 110 HZ) is preferably from 50 to 120° C. The loss elasticity is preferably 1×10$^8$ to 8×10$^9$ dyne/cm$^2$, while the loss tangent is 0.2 or less. With too high a loss tangent, an adhesion trouble is apt to occur.

The amount of the residual solvent contained in the magnetic layer is preferably 100 mg/m$^2$ or less, more preferably 10 mg/m$^2$ or less. The void ratio that the magnetic layer has is preferably 40% by volume or less, more preferably 30% by volume or less. A lower void ratio is preferred for achieving a high output, but depending on the purpose, it may be better to secure a certain value. With a magnetic recording particulate medium for data recording whose repeated uses are emphasized, for example, a higher void ratio often results in better running durability.

The magnetic recording particulate medium of the present invention has at least one magnetic layer, but may have a plurality of magnetic layers depending on the purpose. Between the magnetic layer and the nonmagnetic support, there may be a nonmagnetic layer at least comprising a nonmagnetic powder and a binder. It can be easily anticipated that various physical properties can be varied in each layer. For example, the modulus of elasticity of the magnetic layer is increased to enhance the running durability, and simultaneously, the modulus of elasticity of the nonmagnetic layer is made lower than that of the magnetic layer to better the contact of the magnetic recording particulate medium with the head.

The present invention will now be described in more detail with reference to the following Examples. The components, proportions and procedures described in these Examples can be changed or modified suitably without departing from the spirit of the present invention. Thus, the scope of the invention is not restricted to these concrete examples.

<EXAMPLE 1>

Production of magnetic recording particulate medium

With the types of a ferromagnetic metal powder and polyurethane being changed, 19 kinds of magnetic paints were prepared in accordance with the following method:

A ferromagnetic metal powder was pulverized for 10 minutes in an open kneader. Vinyl chloride resin, polyurethane A, and methyl ethyl ketone/cyclohexanone=1/1 (40 parts by weight) were added, and the mixture was kneaded for 60 minutes. Then, α-$Al_2O_3$, carbon black, and methyl ethyl ketone/cyclohexanone=1/1 (200 parts by weight) were added, and the mixture was dispersed for 120 minutes in a sandmill. Further, polyisocyanate, stearic acid, sec-butyl stearate, stearic acid amide, and toluene were added, and the system was mixed for 20 minutes with stirring. Then, the mixture was filtered through a filter having an average pore diameter of 1 μm to prepare a magnetic paint. The components were mixed in the amounts described in Table 1.

The 19 magnetic paints were prepared by combining ferromagnetic powders A to P with polyurethanes A to D in accordance with Table 6. Details of the ferromagnetic powders A to P are described in Table 6, while details of the polyurethanes A to D are described in Table 2.

The resulting magnetic paints were each coated on the surface of a 10 μm thick PET support by means of an extrusion coating head so that the dry thickness of the resulting coating would be 3 μm. While the magnetic paint was not dry, the coating was oriented in a magnetic field by use of a magnet with 3,000 G. Further, a backcoat layer forming paint having a composition as shown in Table 3 was coated to a dry thickness of 0.5 μm, followed by drying. Then, 5-stage calender treatment by a combination of metal rolls and heat resistant plastic rolls was performed (speed 100 m/min, linear pressure 300 kg/cm, temperature 90° C.), whereafter the composite was slit to a ½ inch width at a rate of 200 m/min to produce magnetic recording particulate media 1 to 19.

TABLE 1

Composition of magnetic paint

| Component | Parts by weight |
|---|---|
| Ferromagnetic metal powder (see Table 6) | 100 |
| Vinyl chloride resin (MR110; made by Nippon Zeon Co., Ltd.) | 10 |
| Polyurethane (see Table 2) | 6 (solids content) |
| α-$Al_2O_3$ (average particle diameter 0.2 μm) | 10 |
| Carbon black (average particle diameter 80 μm) | 2 |
| Polyisocyanate (Colonate 3041; made by Nippon Polyurethane Industry Co, Ltd.) | 4 (solids content) |
| Stearic acid | 1 |
| sec-butyl stearate | 1 |
| Stearic acid amide | 0.2 |
| Methyl ethyl ketone/Cyclohexanone = 1/1 | 240 |
| Toluene | 50 |

TABLE 2

Details of polyurethanes A to D

| | | | A | B | C (control) | D (control) |
|---|---|---|---|---|---|---|
| Polyurethane composition | Polyether polyol | Composition | PPG | PTMG | — | PPG |
| | | Molecular weight | 2000 | 2000 | — | 2000 |
| | | Tg (° C.) | −75 | −84 | — | −75 |
| | | mol | 0.023 | 0.023 | — | 0.046 |
| | Polyester polyol | Composition (mol ratio) | iPA/NPG/EG = 5/5/0.1 | iPA/NPG/CHM = 4.9/4/1.1 | iPA/NPG/PCL = 1/1/8 | — |
| | | Molecular weight | 2000 | 2000 | 2000 | — |
| | | Tg (° C.) | 55 | 62 | 8 | — |
| | | mol | 0.023 | 0.023 | 0.046 | — |
| | Chain extender (mol) | | NPG (0.06) | BD (0.06) | NPG (0.06) | NPG (0.06) |
| | DEIS (mol) | | 0.009 | 0.009 | 0.009 | 0.009 |
| | Diisocyanate (mol) | | MDI (0.1) | MDI (0.1) | MDI (0.1) | MDI (0.1) |
| Weight average molecular weight (million) | | | 3.5 | 5.8 | 5.8 | 3.5 |
| Tg of polyurethane (° C.) | | | +62, −17 | +68, −25 | +32 | −48 |

The Tg in Table 2 was investigated by forming a film of a 20 μm thick binder resin alone, and measuring the peak temperature of E" using Rheovibron (a product of Orientech Co.Ltd). The DEIS in Table 2 is a sodium salt of bis(2-hydroxyethyl)-5-sulfoisophthalate, and PCL denotes polycaprolactone.

TABLE 3

Composition of backcoat layer forming paint

| Component | Parts by weight |
| --- | --- |
| Carbon black (average particle diameter 18 nm) | 100 |
| Nitrocellulose (HIG1/2, ASAHI CHEMICAL INDUSTRY CO., LTD.) | 60 |
| Polyurethane (N-2301, Nippon Polyurethane Industry Co., Ltd.) | 60 |
| Polyisocyanate (Colonate L, Nippon Polyurethane Industry Co., Ltd.) | 20 |
| Methyl ethyl ketone | 1000 |
| Toluene | 1000 |

Testing Methods

The resulting magnetic recording particulate media 1 to 19 were each subjected to the following tests:

(1) Video playback output test

Using the digital β cam VTR DVW-A500 (a product of SONY CORP.), 32.5 MHz signals were recorded onto the magnetic recording particulate medium in an environment of 20° C. and humidity of 50%. The signals were reproduced, and their playback output was measured with a spectrum analyzer. The results were expressed as relative values when the output of a reference tape (D-321, a product of Fuji Photo Film Co., Ltd.) was set at 0 dB.

(2) Audio playback output test

Using the digital β cam VTR DVW-A500 (a product of SONY CORP.), signals of 1 KHz, 10 dB lower than the audio reference input level, were recorded at a reference bias current onto the magnetic recording particulate medium in an environment of 20° C. and humidity of 50%. The signals were reproduced, and their playback output was measured. The results were expressed as relative values when the output of a reference tape (D321, a product of Fuji Photo Film Co., Ltd.) was set at 0 dB.

(3) Head wear test

Using the digital β cam VTR DVW-A500 (a product of SONY CORP.), a 732 m long tape of the magnetic recording particulate medium was causedto run for consecutive 25 takeups, with 2 passes effected per takeup, in an environment of 20° C. and relative humidity of 50%. The head heights before and after running of the tape were measured to determine the amount of head wear.

(4) Head stain test

Using the digital β cam VTR DVW-A500 (a product of SONY CORP.), a 732 m long tape of the magnetic recording particulate medium was caused to run for consecutive 25 takeups, with 2 passes effected per takeup, in an environment of 20° C. and relative humidity of 50%. The state of head stain after running of the tape was evaluated in accordance with the following criteria.

TABLE 4

Evaluation Criteria

| Evaluation | Contents |
| --- | --- |
| ⊚ | Not stained |
| ○ | Slightly stained |
| Δ | Stained |
| X | Stained at head gap site |

(5) Durability test

Using the digital β cam VTR DVW-A500 (a product of SONY CORP.), a 241 m long tape of the magnetic recording particulate medium was caused to run in a "play-rewind" mode in an environment of 5° C. and humidity of 20%. Each tape repeated this "play-rewind" mode of run 200 times. The state of head stain after running of the tape was evaluated in accordance with the criteria of Table 4.

The same test was also conducted in an environment of 40° C. and humidity of 70%.

(6) Break-in VTR run test

Using the digital β cam VTR DVW-A500 (a product of SONY CORP.), 1000 tapes having 732 m long as a magnetic recording particulate medium (D321, a product of Fuji Photo Film Co., Ltd.) was caused to run in a "play-rewind-fast feed-rewind" mode uninterruptedly. The run was performed in an environment of 20° C. and humidity of 50%. Then, stain on each part inside the VTR was cleaned with alcohol to make a broken-in VTR, i.e., a VTR fully used to a degree to which the operator was accustomed to its use.

Using this VTR, a 732 m long tape of each magnetic recording particulate medium was caused to run in a "fast feed-rewind" mode in an environment of 20° C. and humidity of 50%. Each tape repeated this "fast feed-rewind" mode of run 10 times. Then, stains on a fixed guide, a rotating roller and a cylinder lead inside the VTR were evaluated in accordance with the following criteria:

TABLE 5

Evaluation Criteria

| Evaluation | Contents |
| --- | --- |
| ⊚ | Not stained |
| ○ | Slightly stained at fixed guide |
| Δ | Stained at fixed guide and rotating rollers |
| X | Stained at fixed guide, rotating rollers and cylinder lead |

Test Results

The results of the tests on the magnetic recording particulate media 1 to 19 are shown in Table 6.

TABLE 6

Materials and test results

| Magnetic recording medium No. | Ferromagnetic metal powder | | | | | |
|---|---|---|---|---|---|---|
| | No. | Particle shape | Average major axis length ($\mu$m) | Specific surface area ($m^2$/g) | Composition (atom. %) | |
| | | | | | Co/Fe | Al/Fe |
| 1 (present invention) | A | Spindle-shaped | 0.11 | 46 | 4.0 | 10.0 |
| 2 (present invention) | B | Spindle-shaped | 0.15 | 44 | 4.0 | 10.0 |
| 3 (present invention) | C | Spindle-shaped | 0.18 | 46 | 4.0 | 10.0 |
| 4 | D | Acicular | 0.15 | 48 | 4.0 | 10.0 |
| 5 | E | Spindle-shaped | 0.15 | 54 | 4.0 | 10.0 |
| 6 (present invention) | F | Spindle-shaped | 0.13 | 49 | 4.0 | 10.0 |
| 7 (present invention) | G | Spindle-shaped | 0.14 | 41 | 4..0 | 10.0 |
| 8 | H | Spindle-shaped | 0.16 | 38 | 4.0 | 10.0 |
| 9 | I | Spindle-shaped | 0.16 | 44 | 7.0 | 10.0 |
| 10 (present invention) | J | Spindle-shaped | 0.16 | 45 | 5.0 | 10.0 |
| 11 | K | Spindle-shaped | 0.15 | 44 | 0.3 | 10.0 |
| 12 | L | Spindle-shaped | 0.15 | 47 | 4.0 | 18.0 |
| 13 (present invention) | M | Spindle-shaped | 0.15 | 44 | 4.0 | 15.0 |
| 14 (present invention) | N | Spindle-shaped | 0.14 | 46 | 4.0 | 5.0 |
| 15 | O | Spindle-shaped | 0.13 | 43 | 4.0 | 3.0 |
| 16 | P | Spindle-shaped | 0.08 | 47 | 4.0 | 10.0 |
| 17 (present invention) | B | Spindle-shaped | 0.15 | 44 | 4.0 | 10.0 |
| 18 | B | Spindle-shaped | 0.15 | 44 | 4.0 | 10.0 |
| 19 | B | Spindle-shaped | 0.15 | 44 | 4.0 | 10.0 |

| Magnetic recording medium No. | Polyurethane | Video playback output (dB) | Audio playback output (dB) | Head wear ($\mu$m) | Head stain | Durability | | Break-in VTR run |
|---|---|---|---|---|---|---|---|---|
| | | | | | | 5° C. 20% | 40° C. 70% | |
| 1 (present invention) | A | 1.1 | −0.2 | 0.6 | ○ | ⊙ | ⊙ | ⊙ |
| 2 (present invention) | A | 0.9 | 0.1 | 0.8 | ⊙ | ⊙ | ⊙ | ○ |
| 3 (present invention) | A | 0.6 | 0.3 | 1.1 | ⊙ | ○ | ⊙ | ○ |
| 4 | A | 0.5 | 0.2 | 2.8 | x | ○ | Δ | x |
| 5 | A | 0.7 | −0.1 | 2.5 | ○ | x | x | ○ |
| 6 (present invention) | A | 1.2 | −0.2 | 1.0 | Δ | ○ | ⊙ | ○ |
| 7 (present invention) | A | 1.0 | 0.0 | 0.9 | ⊙ | ○ | ○ | ⊙ |
| 8 | A | −0.1 | 0.0 | 2.0 | Δ | ○ | ○ | x |
| 9 | A | 1.8 | −2.6 | 0.9 | ⊙ | ○ | ○ | ⊙ |
| 10 (present invention) | A | 1.4 | −0.8 | 0.9 | ○ | ⊙ | ○ | ⊙ |
| 11 | A | 0.5 | 0.0 | 0.8 | ⊙ | ⊙ | ⊙ | ○ |
| 12 | A | 0.8 | −0.2 | 2.5 | ○ | Δ | ○ | ○ |
| 13 (present invention) | A | 0.9 | 0.0 | 1.4 | ○ | ⊙ | ○ | ⊙ |
| 14 (present invention) | A | 0.7 | −0.1 | 1.2 | ○ | ○ | ⊙ | ⊙ |
| 15 | A | 0.7 | −0.1 | 0.4 | Δ | x | Δ | x |
| 16 | A | 2.0 | −3.0 | 0.6 | x | Δ | ○ | ○ |
| 17 (present invention) | B | 0.7 | 0.1 | 1.0 | ○ | ⊙ | ⊙ | ○ |
| 18 | C | −0.7 | 0.3 | 1.9 | Δ | ○ | Δ | x |
| 19 | D | 1.4 | 0.2 | 0.6 | x | Δ | x | ○ |

The results of Table 6 show that the magnetic recording particulate media fulfilling the conditions of the present invention are all satisfactory in the test results and have excellent properties.

The magnetic recording particulate medium 4 using the acicular ferromagnetic metal powder undergoes considerable head wear, has a marked head stain, and is poor in the break-in VTR run test results. The magnetic recording particulate medium 16 using the ferromagnetic metal powder having an average major axis length of less than 0.1 $\mu$m gives a small audio playback output and a considerable head stain. The magnetic recording particulate medium 5 using the ferromagnetic metal powder having a specific surface area of larger than 50 $m^2$/g undergoes considerable head wear and has poor durability. The magnetic recording particulate medium 8 using the ferromagnetic metal powder having a specific surface area of less than 40 $m^2$/g, by contrast, gives a low video playback output, undergoes considerable head wear and has poor results of the break-in VTR run test. The magnetic recording particulate medium 9 using the ferromagnetic metal powder having a Co/Fe ratio of greater than 5 atomic % is low in audio playback output. The magnetic recording particulate medium 11 using the ferromagnetic metal powder having a Co/Fe ratio of less than 1 atomic %, on the other hand, is low in video playback output. The magnetic recording particulate medium 12 using the ferromagnetic metal powder having an Al/Fe ratio of larger than 15 atomic % is marked in head wear. The magnetic recording particulate medium 15 using the ferromagnetic metal powder having an Al/Fe ratio of less than 5 atomic %, by contrast, is poor in durability and the results of the break-in VTR run test. The magnetic recording particulate medium 18 using polyurethane whose diol component consists of polyester polyol alone is poor in video playback output and the results of the break-in VTR run test. The magnetic recording particulate medium 19 using polyurethane whose diol component consists of polyether polyol alone is marked in head stain and poor in durability.

As seen from above, in order to achieve satisfactory results in all the tests, it is necessary to provide a magnetic layer comprising a combination of (1) a ferromagnetic metal powder comprising spindle-shaped particles consisting essentially of Fe and having a Co/Fe ratio of from 1 to 5 atomic %, an Al/Fe ratio of from 5 to 15 atomic %, an average major axis length of 0.1 to 0.2 $\mu$m and a specific surface area of 40 to 50 m$^2$/g, and (2) abinder containing a polyurethane consisting essentially of a diol component comprising a polyether polyol and a polyester polyol and a polyisocyanate component.

<EXAMPLE 2>

Production of magnetic recording particulate medium Magnetic recording particulate media 20 to 27 different in $M_{0.1}/Mt$ and $H_{20-30}/H_{10-20}$ were produced in accordance with the methods described below.

A ferromagnetic metal powder was pulverized for 10 minutes in an open kneader. Carbon black, vinyl chloride resin, polyurethane, and methyl ethyl ketone/cyclohexanone (1/1) (60 parts by weight for the production of magnetic recording particulate media 20 to 26; 40 parts by weight for the production of magnetic recording particulate medium 27) were added, and the mixture was kneaded for 60 minutes. To the kneaded system, methyl ethyl ketone/cyclohexanone (1/1) (200 parts by weight for the production of magnetic recording particulate media 20 to 26; 220 parts by weight for the production of magnetic recording particulate medium 27) was added over the course of 6 hours, with the open kneader being operated. Then, a dispersion of an abrasive was added, and the mixture was dispersed for 120 minutes in a sand grinder. Further, polyisocyanate, stearic acid, sec-butyl stearate, stearic acid amide, and toluene were added, and the system was mixed for 20 minutes with stirring. Then, the mixture was filtered through a filter having an average pore diameter of 1 $\mu$m to prepare a magnetic paint. The components were mixed in the amounts described in Table 7.

The 8 kinds of magnetic paints were prepared by suitably changing the types, etc. of the abrasive dispersion and polyurethane as described in Table 8. Details of the abrasive dispersions a to c used are described in Table 9, while details of the polyurethane A used are described in Table 10.

The resulting magnetic paints were each coated on the surface of a 11 $\mu$m thick PET support by means of an extrusion coating head so that the dry thickness of the resulting coating would be 3 $\mu$m. While the magnetic paint was not dry, the coating was oriented in a magnetic field by use of a magnet with 3,000 G. Further, a backcoat layer forming paint having a composition as shown in Table 11 was coated to a dry thickness of 0.5 $\mu$m, followed by drying. Then, 5-stage calender treatment by a combination of metal rolls and heat resistant plastic rolls was performed (linear pressure 300 kg/cm; for the speed and temperature, see Table 8). The resulting roll was thermo treated for 24 hours at 65° C., and slit to a ½ inch width at a rate of 200 m/min. Further, the slit material was blade treated by the LTBL method or the DWBL method to produce magnetic recording particulate media 20 to 27.

TABLE 7

| Composition of magnetic paint | |
|---|---|
| Component | Parts by weight |
| Ferromagnetic metal powder (spindle-shaped, average major axis length 0.11 $\mu$m, specific surface area 46 m$^2$/g, Co/FE 4 atom. %, Al/Fe 10 atom. %) | 100 |
| Carbon black (average particle diameter 80 nm) | 2 |
| Vinyl chloride resin (MR110; made by Nippon Zeon Co., Ltd.) | 10 |
| Polyurethane (see Tables 8 and 10) | 6 (solids content) |
| Methyl ethyl ketone/Cyclohexanone (1/1) | 260 |
| Abrasive dispersion (see Tables 8 and 9) | (see Table 8) |
| Polyisocyanate (Colonate 3041; made by Nippon Polyurethane Industry Co, Ltd.) | 4 (solids content) |
| Stearic acid | 1 |
| sec-butyl stearate | 1 |
| Stearic acid amide | 0.2 |
| Toluene | 50 |

TABLE 8

Types of materials and manufacturing conditions

| Magnetic recording medium No. | Abrasive dispersion (parts by weight) | | | | Type of polyurethane | Calender treatment conditions | | Type of blade treatment (Note 1) |
|---|---|---|---|---|---|---|---|---|
| | a | b | c | d | | Temperature (° C.) | Speed (m/sec) | |
| 20 | 22 | — | 3 | — | A | 85 | 200 | LTBL |
| 21 (present invention) | 22 | 3 | — | — | A | 85 | 200 | LTBL |
| 22 (present invention) | 20 | 5 | — | — | A | 85 | 200 | LTBL |
| 23 (present invention) | 20 | — | — | 5 | A | 85 | 200 | LTBL |
| 24 | 10 | — | — | 15 | A | 85 | 200 | LTBL |
| 25 | 20 | 5 | — | — | A | 95 | 100 | DWBL |
| 26 (present invention) | 20 | 5 | — | — | A | 85 | 200 | DWBL |
| 27 (present invention) | 20 | 5 | — | — | A | 85 | 200 | LTBL |

TABLE 8-continued

Types of materials and manufacturing conditions

| Magnetic recording medium No. | Abrasive dispersion (parts by weight) | | | | Type of polyurethane | Calender treatment conditions | | Type of blade treatment (Note 1) |
|---|---|---|---|---|---|---|---|---|
| | a | b | c | d | | Temperature (° C.) | Speed (m/sec) | |

(Note 1)
LTBL method: The slit magnetic tape was blade treated at a feed tension of 40 g/(½ inch width) by the use of an abrasive tape (MS-20000, Fuji Photo Film Co., Ltd.)
DWBL method: The slit magnetic tape was conveyed at 7 m/sec, and blade treated at a feed tension of 70 g/(½ inch width) while rotating a rotating roll (DW#800 of Oriental Diamond Industry Research Institute, diameter 7 cm, lapping angle 90°) at a tangential speed of 7 m/sec.

TABLE 9

Type and details of abrasive dispersion

| Type of abrasive dispersion | Contents |
|---|---|
| a | Dispersion prepared by placing a mixture of the following components in a vessel coated with zirconium oxide ($ZrO_2$), and dispersion it for 1 hour in a sand grinder using beads of zirconium oxide 1.5 mm in diameter |
| | [Components]      [Parts by weight] |
| | $\alpha$-$Al_2O_3$ (HIT-50 of SUMITOMO CHEMICAL CO., LTD., average particle diameter 0.2 μm, no particles 0.3 μm or larger)    100 |
| | Vinyl chloride resin (MR-110, Nippon Zeon Co., Ltd.)    10 |
| | Methyl ethyl ketone/cyclohexanone (1/1)    90 |
| b | Dispersion prepared by mixing the following components with Air Disper, placing the mixture in a vessel coated with zirconium oxide ($ZrO_2$), and dispersing it for 1 hour in a sand grinder using beads of zirconium oxide 1.5 mm in diameter |
| | [Components]      [Parts by weight] |
| | $Cr_2O_3$ (G-5 of Nippon Chemical Industrial Co., Ltd., average particle diameter 0.33 μm, proportion of particles 0.43 μm or larger = 18%)    100 |
| | Vinyl chloride resin (MR-110, Nippon Zeon Co., Ltd.)    10 |
| | Methyl ethyl ketone/cyclohexanone (1/1)    90 |
| c | Dispersion prepared by mixing the following components with the Air Disper for 10 minutes, placing the mixture in a vessel coated with zirconium oxide ($ZrO_2$), and dispersing it for 24 hours in a sand grinder using beads of zirconium oxide 0.9 mm in diameter |
| | [Components]      [Parts by weight] |
| | $Cr_2O_3$ (G-5 of Nippon Chemical Industrial Co., Ltd., average particle diameter 0.33 μm, proportion of particles 0.43 μm or larger = 18%)    100 |
| | Vinyl chloride resin (MR-110, Nippon Zeon Co., Ltd.)    10 |
| | Methyl ethyl ketone/cyclohexanone (1/1)    90 |
| d | Dispersion prepared by mixing the following components with the Air Disper for 10 minutes |
| | [Components]      [Parts by weight] |
| | $Cr_2O_3$ (G-5 of Nippon Chemical Industrial Co., Ltd., average particle diameter 0.33 μm, proportion of particles 0.43 μm or larger = 18%)    100 |
| | Vinyl chloride resin (MR-110, Nippon Zeon Co., Ltd.)    10 |
| | Methyl ethyl ketone/cyclohexanone (1/1)    90 |

TABLE 10

Type and details of polyurethane

Polyurethane A

| Polyurethane composition | Polyether polyol | Composition | PPG |
|---|---|---|---|
| | | Molecular weight | 2000 |
| | | Tg (° C.) | −75 |
| | | Mol | 0.023 |
| | Polyester polyol | Composition (mol ratio) | iPA/NPG/EG = 5/5/0.1 |
| | | Molecular weight | 2000 |
| | | Tg (° C.) | 55 |

TABLE 10-continued

Type and details of polyurethane

|  | Polyurethane A |
| --- | --- |
| Mol | 0.023 |
| Chain extender (mol) | NPG (0.06) |
| DEIS (mol) (Note 1) | 0.009 |
| Diisocyanate (mol) | MDI (0.1) |
| Weight average molecular weight (million) | 3.5 |
| Tg of polyurethane (° C.) (Note 2) | +62, −17 |

Note 1: DEIS denotes a sodium salt of bis(2-hydroxyethyl)-5-sulfoisophthalate.
Note 2: Tg was investigated by forming a film of a 20 μm thick binder resin alone, and measuring the peak temperature of E" using Vibron (a product of Orientech).

TABLE 11

Composition of backcoat layer forming paint

| Component | Parts by weight |
| --- | --- |
| Carbon black (average particle diameter 18 nm) | 100 |
| Nitrocellulose (HIG1/2, ASAHI CHEMICAL INDUSTRY CO., LTD.) | 60 |
| Polyurethane (N-2301, Nippon Polyurethane Industry Co., Ltd.) | 60 |
| Polyisocyanate (Colonate L, Nippon Polyurethane Industry Co., Ltd.) | 20 |
| Methyl ethyl ketone | 1000 |
| Toluene | 1000 |

Measurement and testing methods

The resulting magnetic recording particulate media 20 to 27 were each measured for Mt, $M_{0.1}$, $H_{10-20}$ and $H_{20-30}$.

The average particle diameter, particle diameter distribution, and height distribution of protrusion of the abrasive were measured in the following manner: The surface of the magnetic layer was photographed at a magnification of 20,000 times using a scanning electron microscope (SEM). The location of shooting was randomly selected for each sample, and pictures were taken in 30 fields of view. The abrasive portions in the so taken SEM pictures were marked, and the abrasive presence density Mt in the surface of the magnetic layer was determined based on the number of the marks. The SEM pictures were also subjected to the image analyzer Contron 400 to input the shapes of the abrasive particles in a digitized manner, thereby determining the distribution of the particle sizes. From the particle size distribution, $M_{0.1}$ was determined. Then, the height distribution of the abrasive was determined by means of an atomic force microscope (AFM; Nanoscope III of Digital Instruments). The probe used was a regular-tetrahedral one with a ½ edge angle of 35° and a radius of curvature of 100 mm or less, and probing was performed in a contact mode using a Ver. 3.25 software. The sample was 15×15 μm square. The results of measurement were subjected to tertiary correction to correct the inclination, etc., and then processed with a command for calculating the number of peaks in the analysis of roughness to determine the distribution of protrusions.

The resulting magnetic recording particulate media 20 to 27 were each subjected to the following tests:

(1) Video S/N test

Using a β cam SP-VTR BVW-75 model (a product of SONY CORP.), 50% gray signals were recorded onto the magnetic recording particulate medium in an environment of 20° C. and humidity of 50%. The S/N ratio of the playback signals was measured with Shibasoku Noise Meter, and deviations of these measurements from the measurements obtained with a reference tape (M-321SP, a product of Fuji Photo Film Co., Ltd.) were calculated. The conditions for the noise meter were HPF=10 kHz and LPF=4.2 MHz.

(2) Audio sensitivity test

Using a β cam SP-VTR BVW-75 model (a product of SONY CORP.), signals of 1 KHz, 10 dB lower than the reference input level, were recorded at a reference bias current onto the magnetic recording particulate medium in an environment of 20° C. and humidity of 50%. The signals were reproduced, and their playback output was compared with the output of a reference tape (M-321SP, a product of Fuji Photo Film Co., Ltd.).

(3) Head wear test

Using a β cam SP-VTR BVW-75 model (a product of SONY CORP.), a 670 m long tape of the magnetic recording particulate medium was caused to run for consecutive 33 takeups, with 2 passes ef fected per takeup, in an environment of 20° C. and relative humidity of 50%. The head heights before and after running of the tape were measured to determine the amount of head wear.

(4) Head stain test

Using a β cam SP-VTR BVW-75 model (a product of SONY CORP.), a 670 m long tape of the magnetic recording particulate medium was caused to run for consecutive 33 takeups, with 2 passes effected per takeup, in an environment of 20° C. and relative humidity of 50%. The state of head stain after running of the tape was evaluated in accordance with the criteria of Table 4.

(5) Durability test

Using a β cam SP-VTR BVW-75 model (a product of SONY CORP.), a 222 m long tape of the magnetic recording particulate medium was caused to run in a "play-rewind" mode in an environment of 3° C. and humidity of 5%. Each tape repeated this "play-rewind" mode of run 200 times. The state of head stain after running of the tape was evaluated in accordance with the criteria of Table 4.

The same test was also conducted in an environment of 45° C. and humidity of 80%.

(6) Still life test

Using a β cam SP-VTR BVW-75 model (a product of SONY CORP.), video signals were recorded at an optimum recording current, and the period of time until the playback output after envelope detection lowered by 3 dB was measured. An environment for the test was at −5° C.

Test results

The results of tests on the magnetic recording particulate media 20 to 27 are shown in Table 12.

TABLE 12

Abrasives and test results

| Magnetic recording medium No. | Abrasive present in surface of magnetic layer | | Test results | | | | | | |
|---|---|---|---|---|---|---|---|---|---|
| | | | Video | Audio | Head | | Durability | | |
| | $M_{0.1}/Mt$ | $H_{20-30}/H_{10-20}$ | S/N (dB) | sensitivity (dB) | wear ($\mu$/100 H) | Head stain | 3° C. 5% | 45° C. 80% | Still life (min) |
| 20 | 0.003 | 0.23 | 0.7 | −0.1 | 0.9 | x | x | Δ | 30 min |
| 21 (present invention) | 0.05 | 0.23 | 0.6 | −0.1 | 0.8 | ○ | Δ | ○ | 48 min |
| 22 (present invention) | 0.12 | 0.23 | 0.6 | 0.0 | 1.2 | ⊙ | ○ | ⊙ | 60 min or more |
| 23 (present invention) | 0.27 | 0.23 | 0.5 | 0.1 | 0.9 | ○ | ○ | Δ | 60 min or more |
| 24 | 0.5 | 0.23 | 0.4 | 0.0 | 1.2 | ○ | ○ | x | 18 min |
| 25 | 0.12 | 0 | 0.9 | −1.1 | 0.5 | Δ | ○ | Δ | 12 min |
| 26 (present invention) | 0.12 | 0.08 | 0.7 | −0.3 | 0.9 | ○ | Δ | ○ | 45 min |
| 22 (present invention) | 0.12 | 0.23 | 0.6 | 0.0 | 1.2 | ⊙ | ○ | ⊙ | 60 min or more |
| 27 (present invention) | 0.12 | 0.37 | 0.7 | 0.2 | 0.9 | ⊙ | ○ | ○ | 60 min or more |

According to Table 12, the magnetic recording particulate media 21, 22, 23, 26 and 27 show relatively satisfactory results. This finding indicates that the electromagnetic characteristics are satisfactory and head wear and head clogging are reduced, when $M_{0.1}/Mt$ is set at from 0.01 to 0.4 and $H_{20-30}/H_{10-20}$ is set at from 0.05 to 0.6.

What is claimed is:

1. A magnetic recording particulate medium having a magnetic layer on a nonmagnetic support, said magnetic layer containing a ferromagnetic metal powder and a binder and having a coercive force of 1,400 to 1,700 Oe, wherein
   the ferromagnetic metal powder is spindle-shaped particles consisting essentially of Fe and having a Co amount of from 1 to 5 atomic % based on Fe, an Al amount of from 5 to 15 atomic % based on Fe, an average major axis length of 0.1 to 0.2 $\mu$m and a specific surface area of 40 to 50 m$^2$/g, and
   the binder contains a polyurethane consisting essentially of a diol component comprising a polyether polyol and a polyester polyol and a polyisocyanate component.

2. The magnetic recording particulate medium as claimed in claim 1, wherein the spindle-shaped particles of the ferromagnetic metal powder have a major axis length r1, a minor axis length r2, and an axial ratio (r1/r2) from 5 to 10.

3. The magnetic recording particulate medium as claimed in claim 1, wherein 1 to 10 atomic %, based on Fe, of a rare earth element is contained in the ferromagnetic powder.

4. The magnetic recording particulate medium as claimed in claim 3, wherein the rare earth element is Nd or Y.

5. The magnetic recording particulate medium as claimed in claim 1, wherein the crystallite size of the ferromagnetic metal powder is 100 to 250 Å.

6. The magnetic recording particulate medium as claimed in claim 1, wherein the saturation magnetization of the ferromagnetic metal powder is 100 to 180 emu/g.

7. The magnetic recording particulate medium as claimed in claim 1, wherein 0.1 to 2.0% by weight of moisture is contained in the ferromagnetic metal powder.

8. The magnetic recording particulate medium as claimed in claim 1, wherein the weight average molecular weight of the polyurethane is 20,000 to 200,000.

9. The magnetic recording particulate medium as claimed in claim 1, wherein the polyurethane has at least two Tg's, one of the Tg's being −250 to 10° C., and the other Tg being 40 to 130° C.

10. The magnetic recording particulate medium as claimed in claim 9, wherein one of the Tg's of the polyurethane is −200 to 10° C., and the other Tg is 45 to 110° C.

11. The magnetic recording particulate medium as claimed in claim 1, wherein the Tg of the polyether polyol is 0° C. or lower.

12. The magnetic recording particulate medium as claimed in claim 1, wherein the molecular weight of the polyether polyol is 400 to 10,000.

13. The magnetic recording particulate medium as claimed in claim 1, wherein the proportion of the polyether polyol in the polyurethane is 3 to 80% by weight.

14. The magnetic recording particulate medium as claimed in claim 1, wherein the molecular weight of the polyester polyol is 400 to 10,000.

15. The magnetic recording particulate medium as claimed in claim 1, containing an abrasive in the magnetic layer and fulfilling the following condition equation:

$$0.01 \leq M_{0.1}/Mt \leq 0.4$$

where Mt designates the number per unit area (number/$\mu$m$^2$) of abrasive particles present in the surface of the magnetic layer, and $M_{0.1}$, designates the number per unit area (number/$\mu$m$^2$) of abrasive particles present in the surface of the magnetic layer and having a particle diameter greater than an average particle diameter by 0.1 $\mu$m or more.

16. The magnetic recording particulate medium as claimed in claim 15, fulfilling the following condition equation:

$$0.05 \leq M_{0.1}/Mt \leq 0.3$$

17. The magnetic recording particulate medium as claimed in claim 15, containing an abrasive in the magnetic layer and fulfilling the following condition equation:

$$0.05 \leq H_{20-30}/H_{10-20} \leq 0.6$$

where $H_{10-20}$ designates the number per unit area (number/$\mu$m$^2$) of abrasive particles having a height of protrusion from the surface of the magnetic layer of 10 nm or more but less than 20 nm, and $H_{20-30}$ designates the number per unit area (number/$\mu$m$^2$) of abrasive particles having a height of protrusion from the surface of the magnetic layer of 20 nm or more but less than 30 nm.

18. The magnetic recording particulate medium as claimed in claim 17, which fulfills the following condition equation:

$0.15 \leq H_{20-30}/H_{10-20} \leq 0.4$

19. The magnetic recording particulate medium as claimed in claim 1, which contains carbon black in the magnetic layer.

20. The magnetic recording particulate medium as claimed in claim 1, wherein a backcoat layer is formed on the surface of the support on the side opposite to the side on which the magnetic layer is present.

* * * * *